June 4, 1968  P. T. FARNSWORTH  3,386,883
METHOD AND APPARATUS FOR PRODUCING NUCLEAR-FUSION REACTIONS
Filed May 13, 1966  16 Sheets-Sheet 1
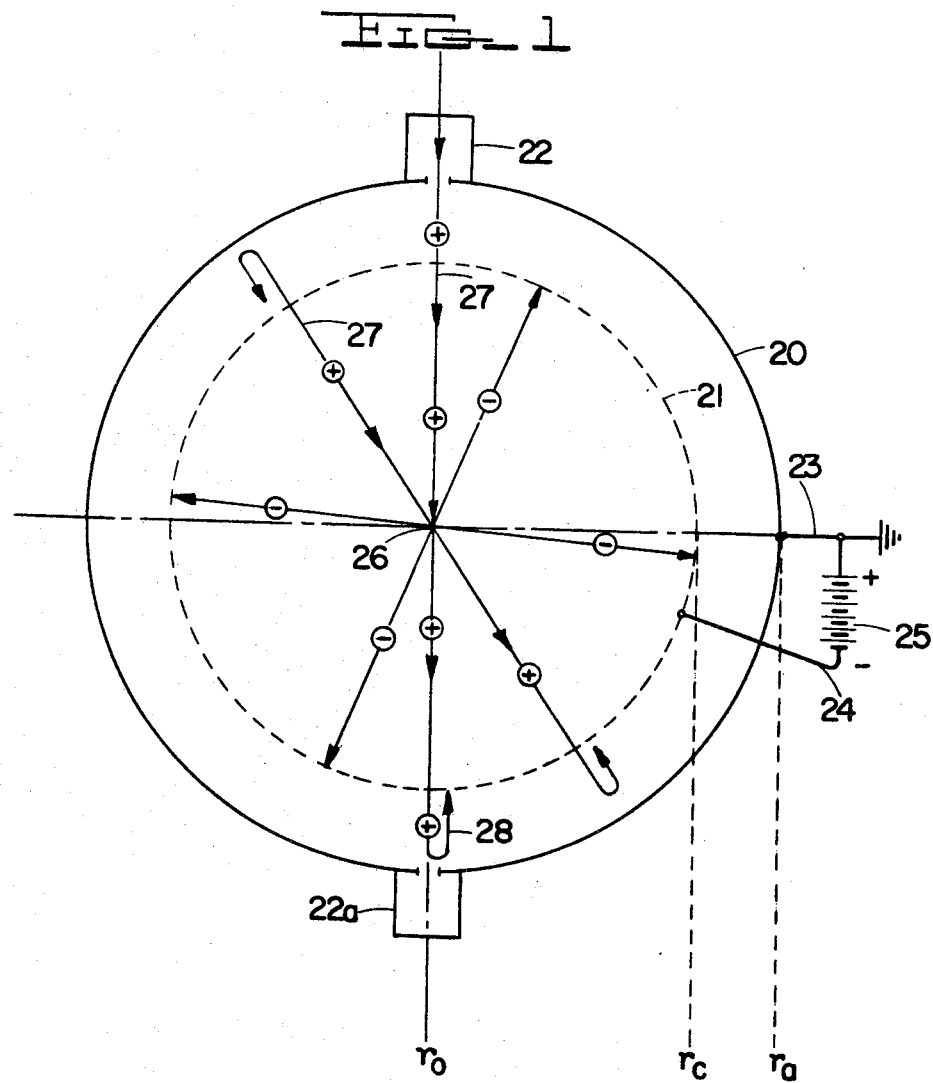
INVENTOR
PHILO T. FARNSWORTH
BY Hood, Gust & Irish
ATTORNEYS

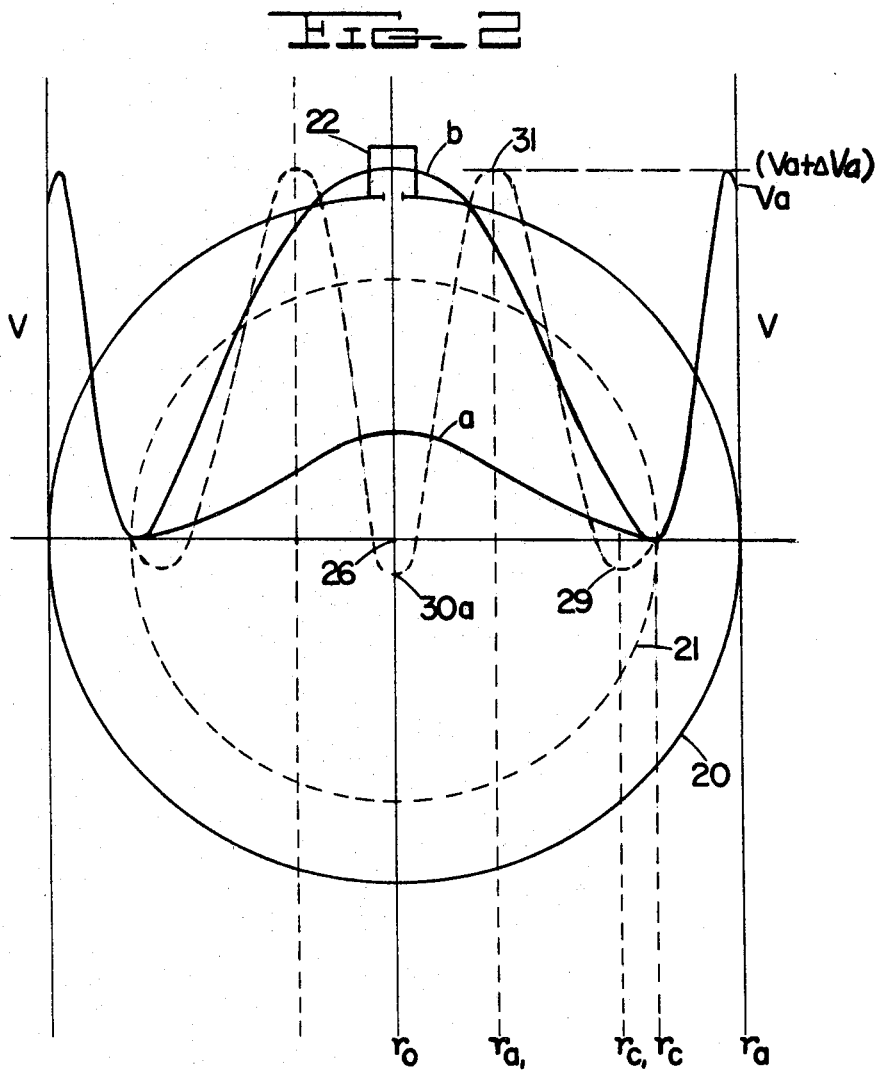

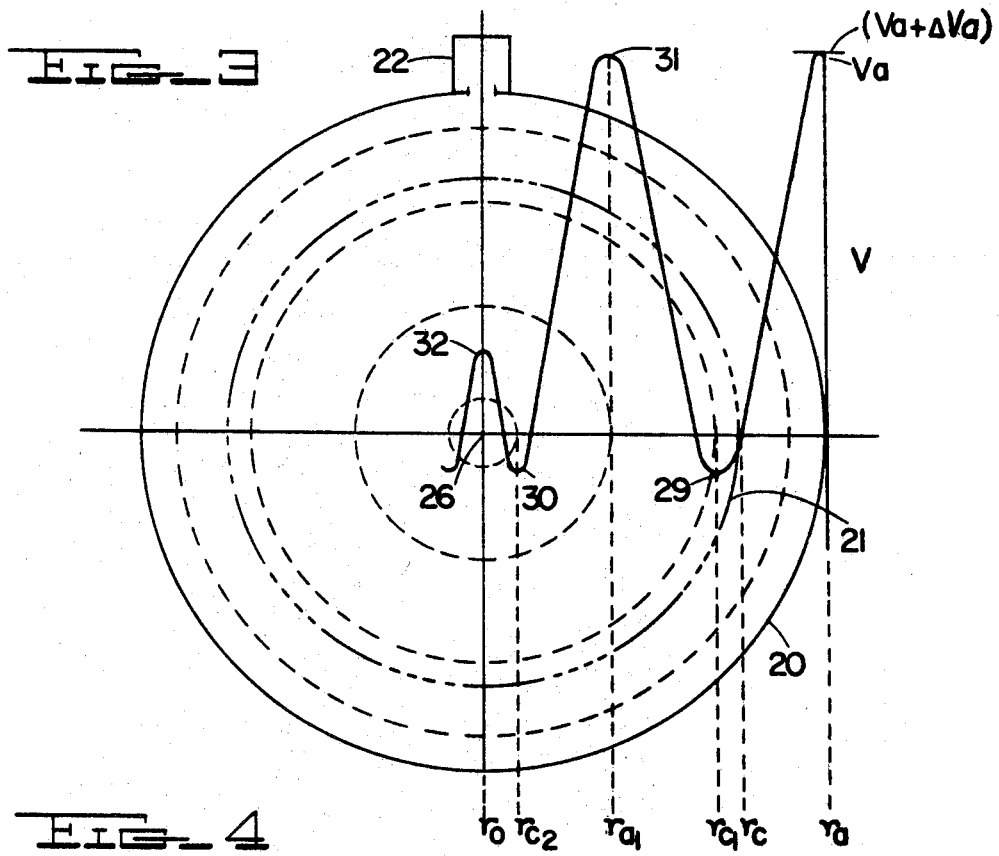
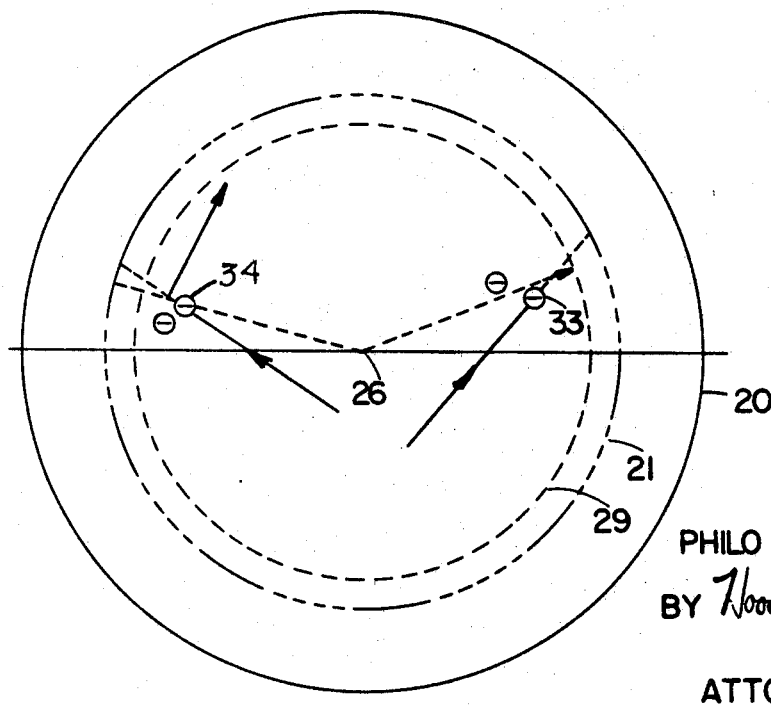

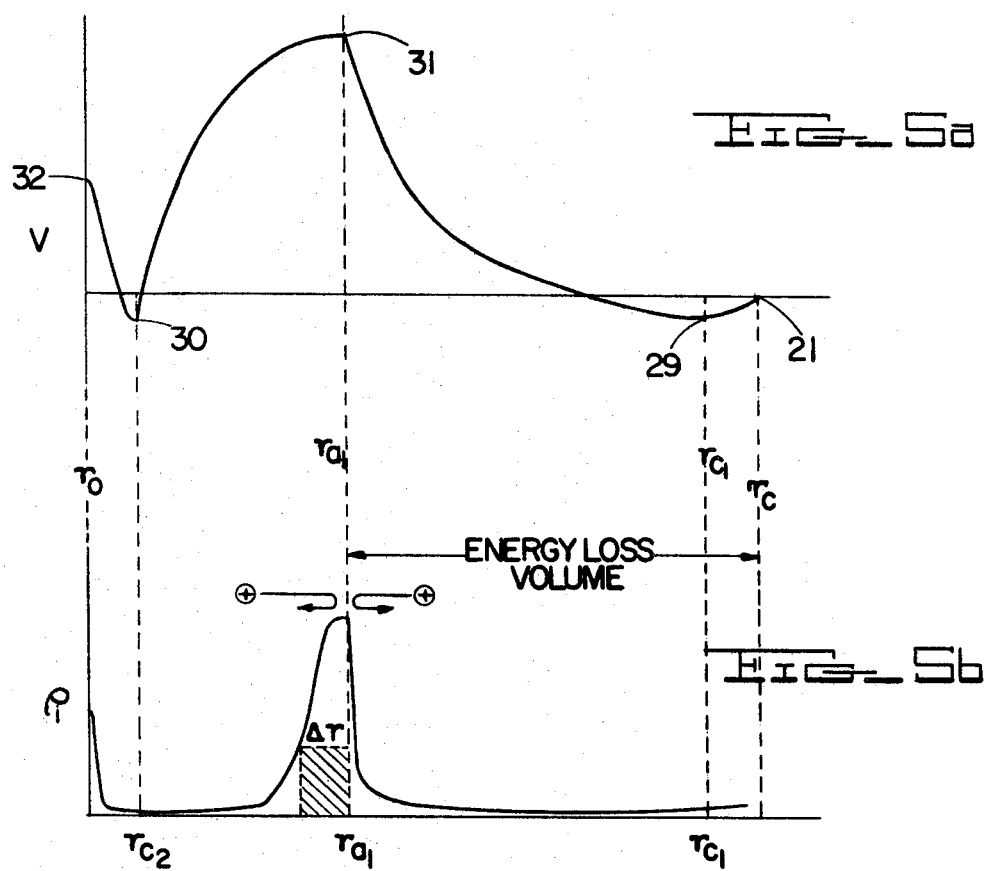
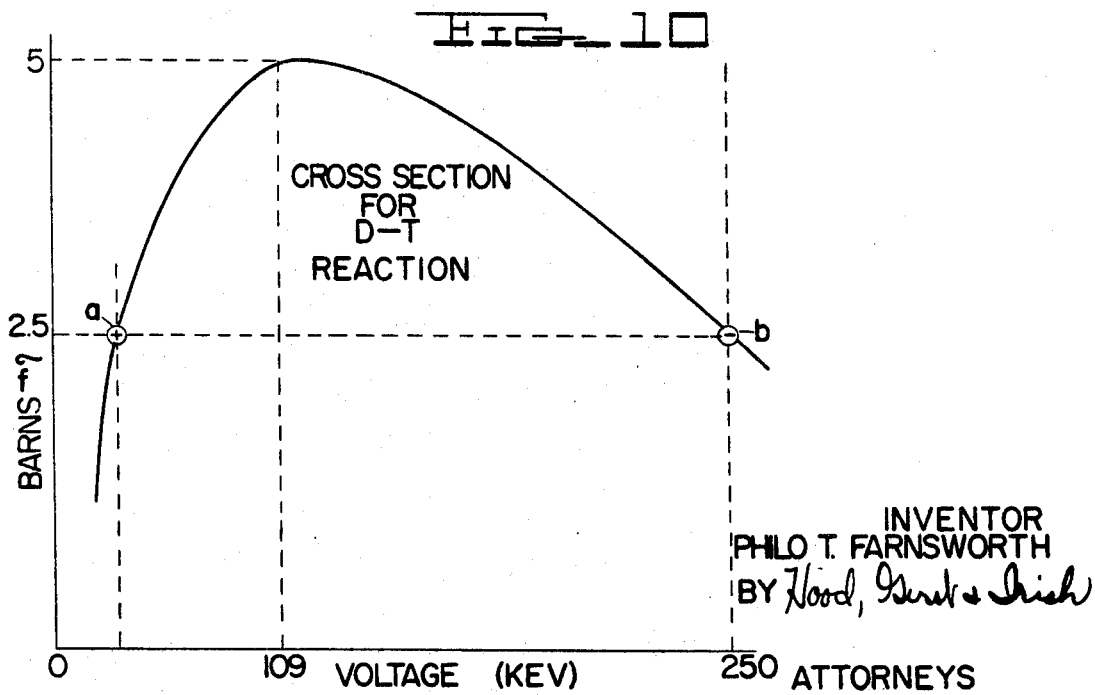

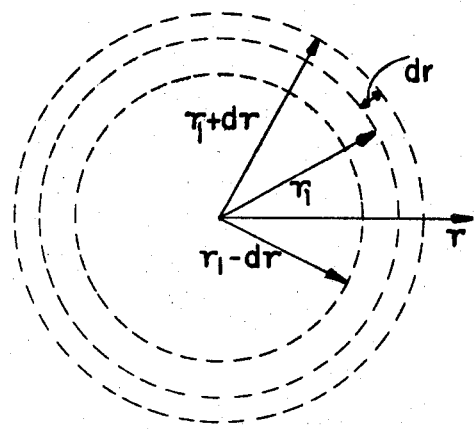
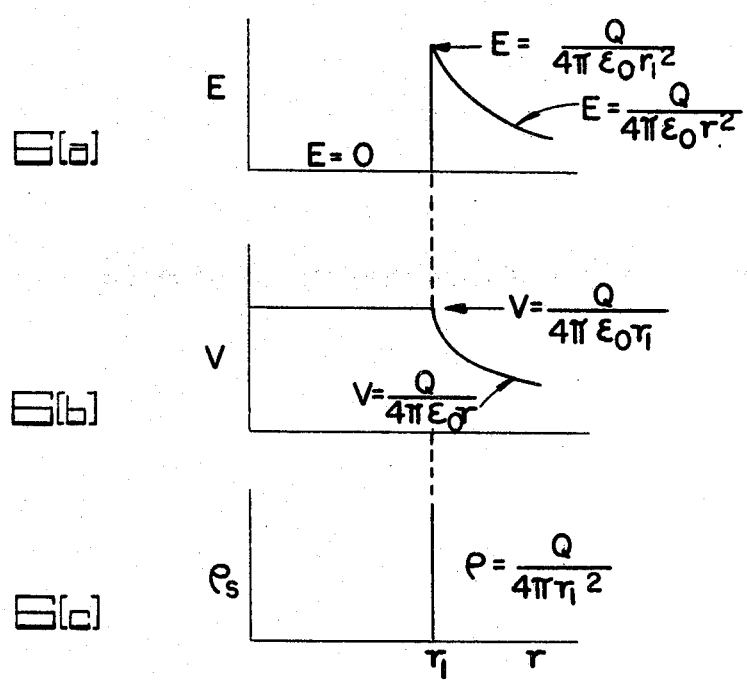

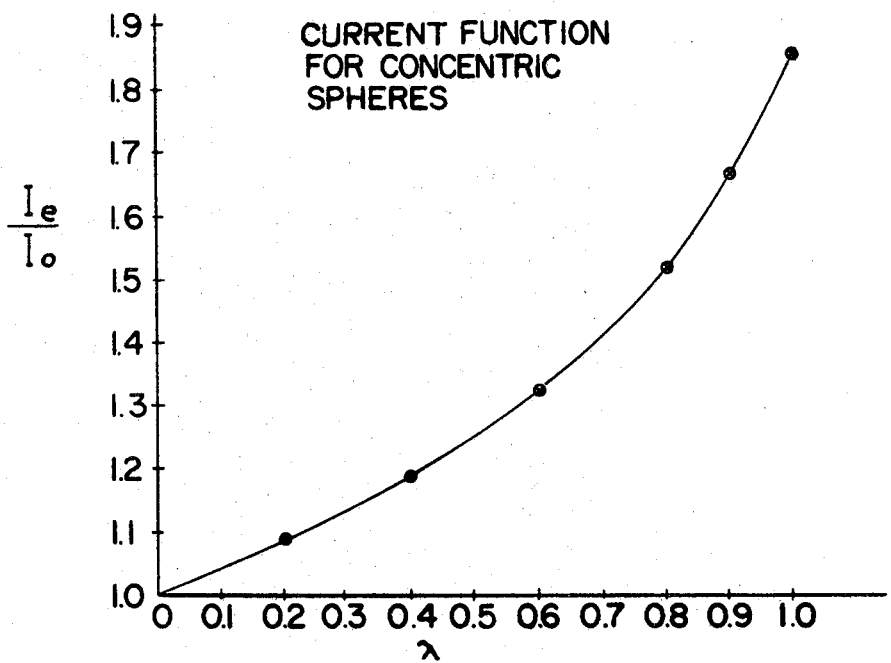

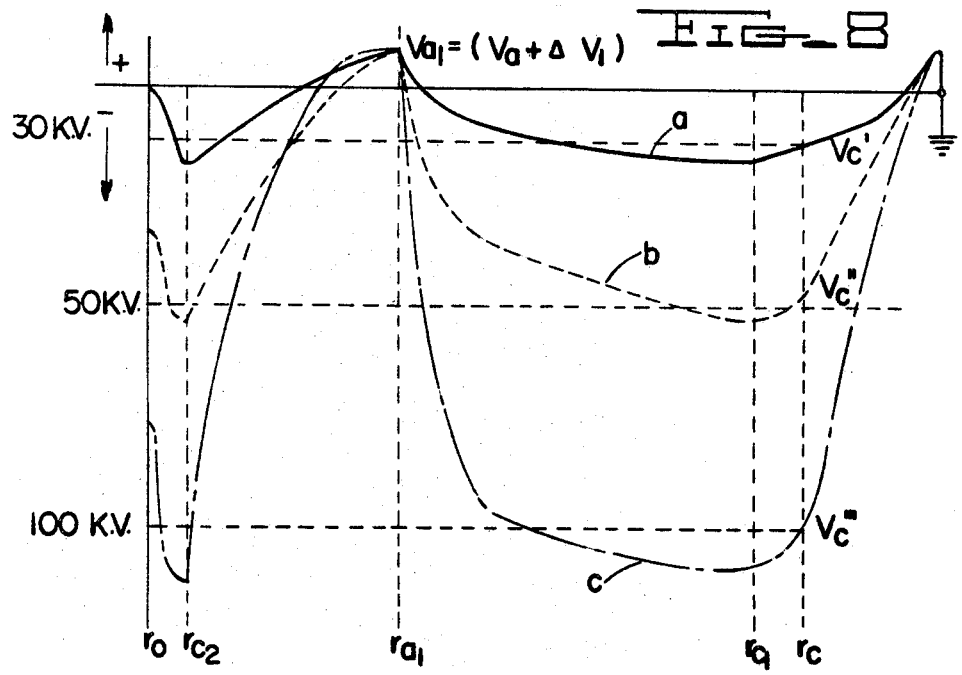
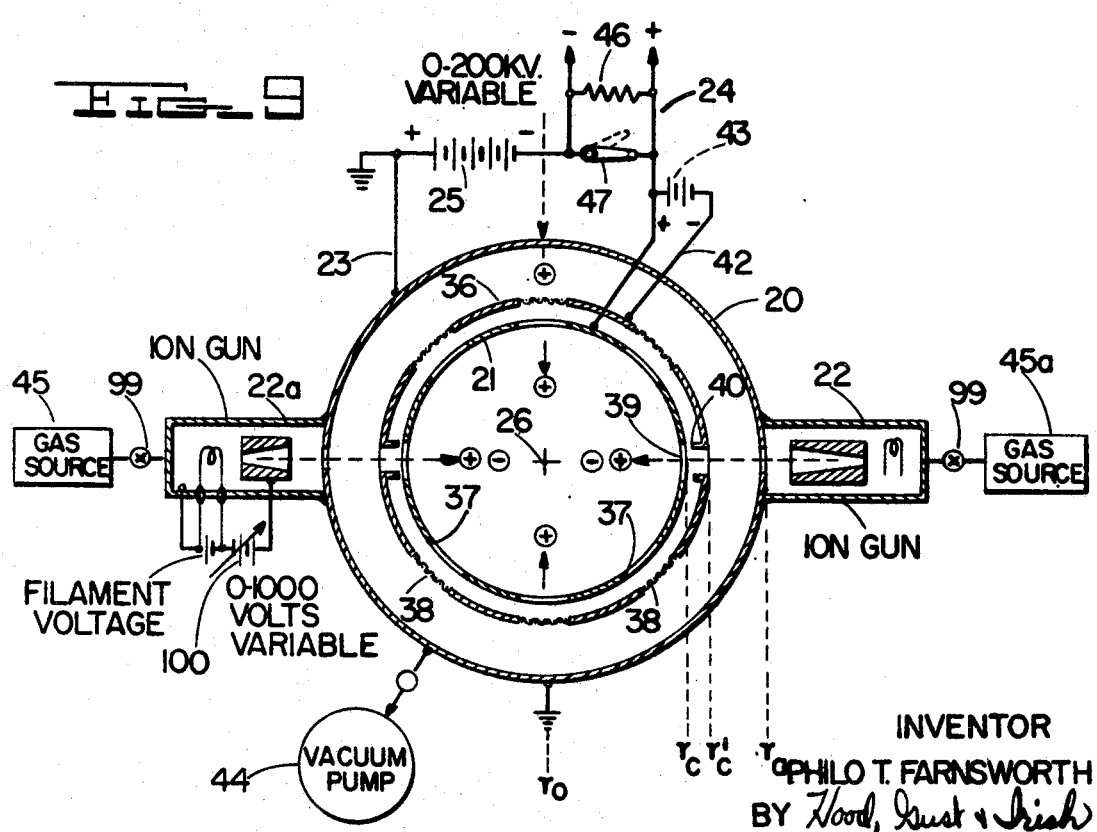

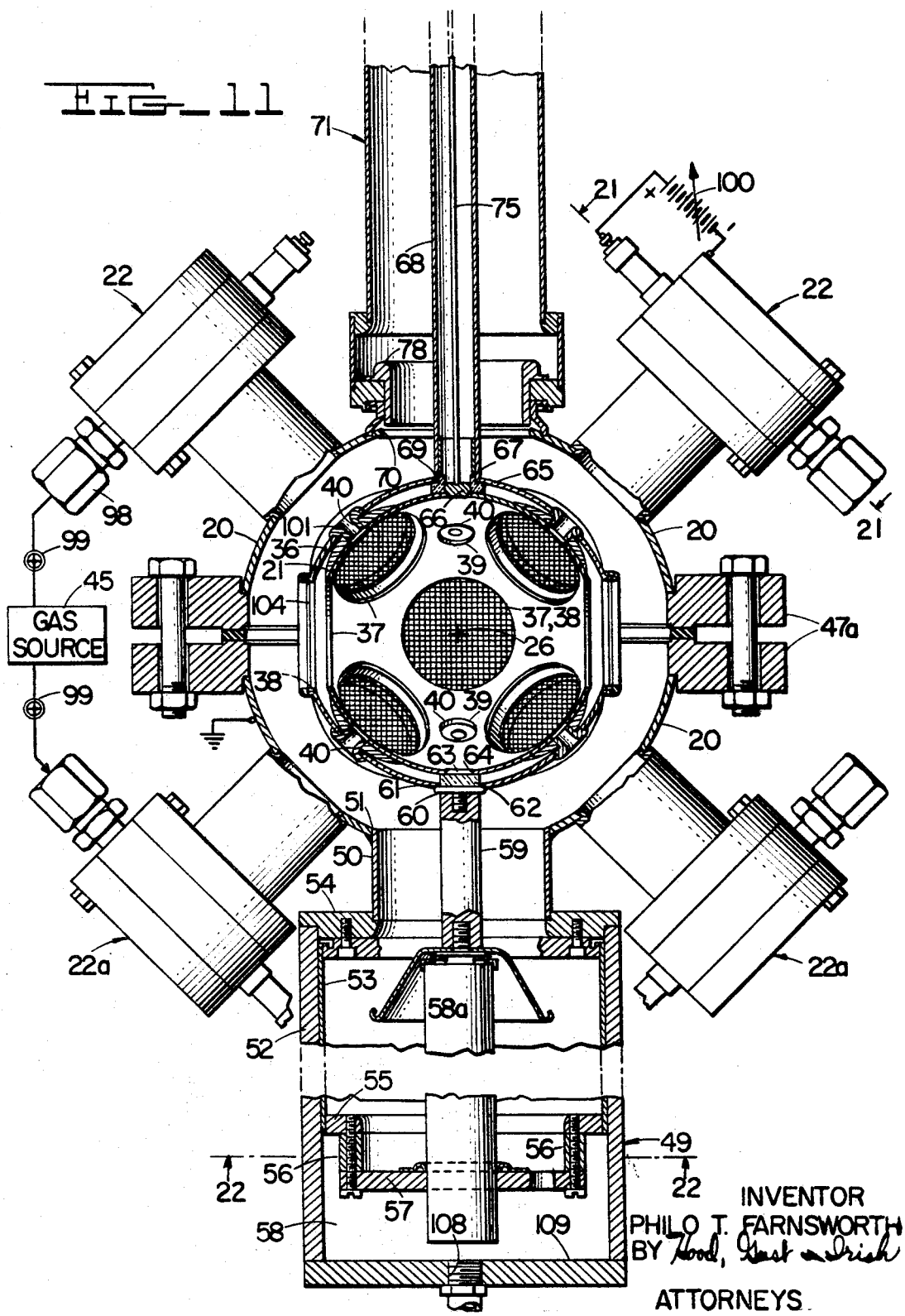

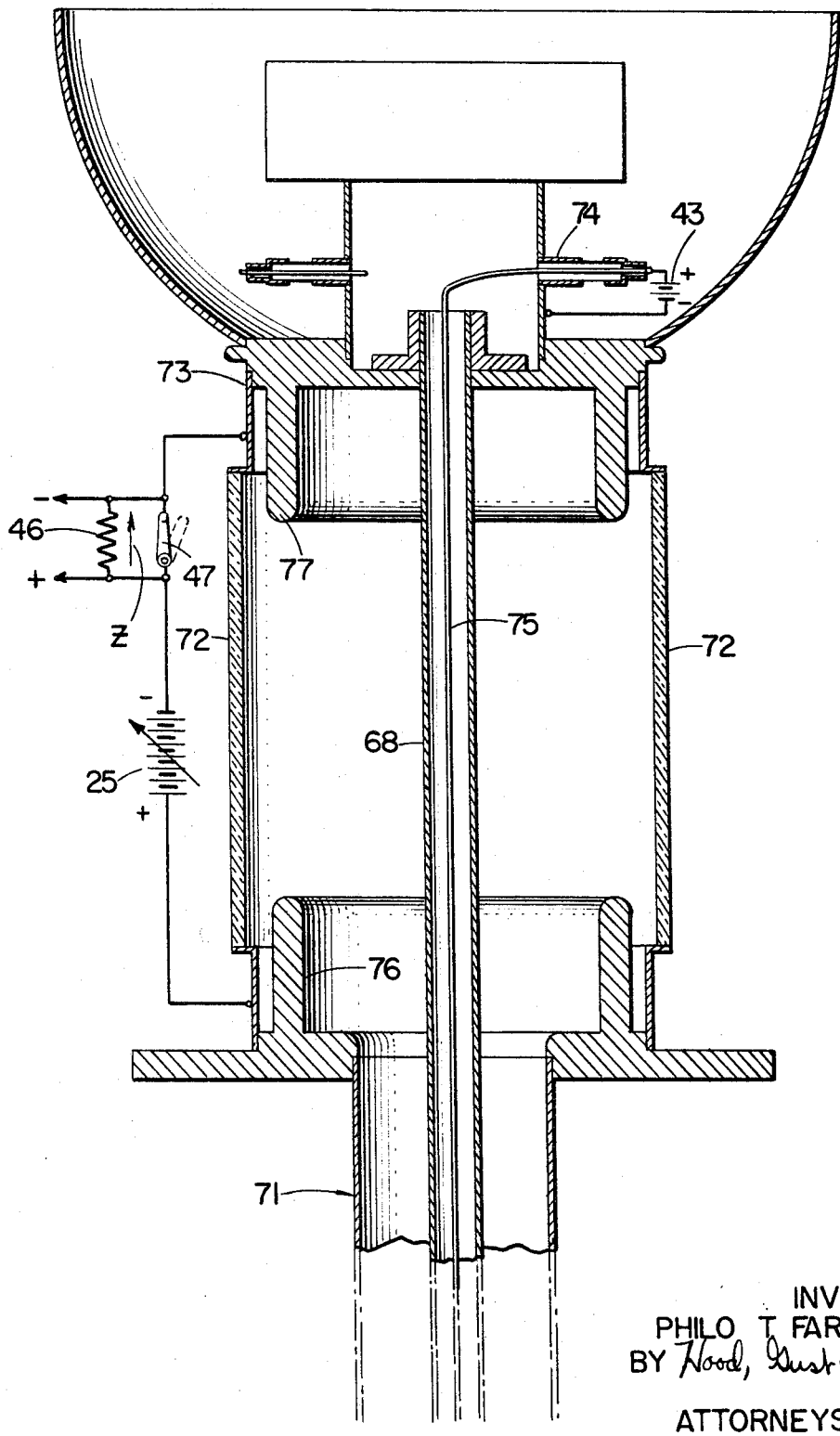

June 4, 1968  P. T. FARNSWORTH  3,386,883
METHOD AND APPARATUS FOR PRODUCING NUCLEAR-FUSION REACTIONS
Filed May 13, 1966  16 Sheets-Sheet 10
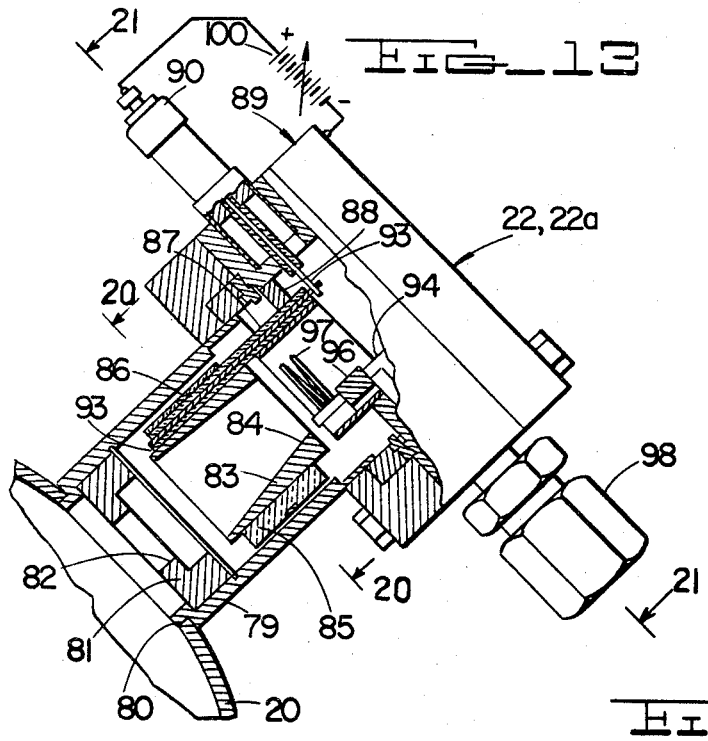
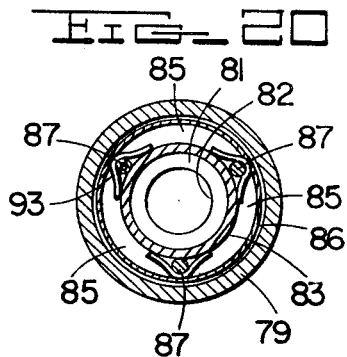
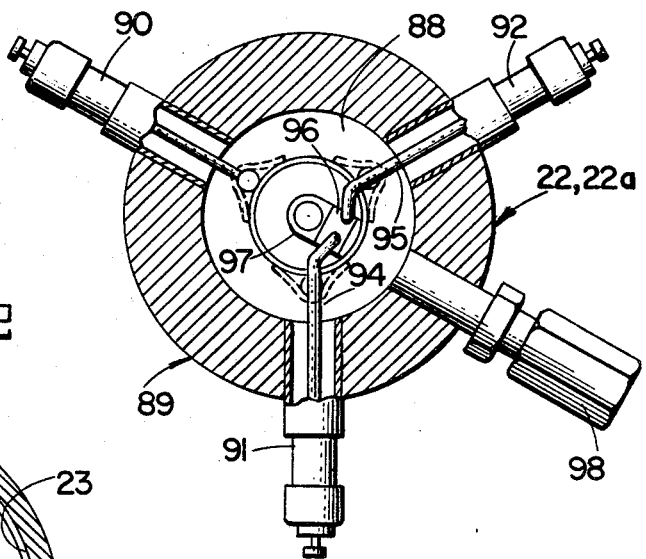
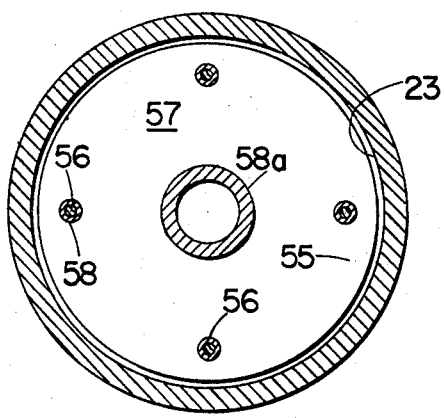
INVENTOR
PHILO T. FARNSWORTH
BY Wood, Just & Irish
ATTORNEYS

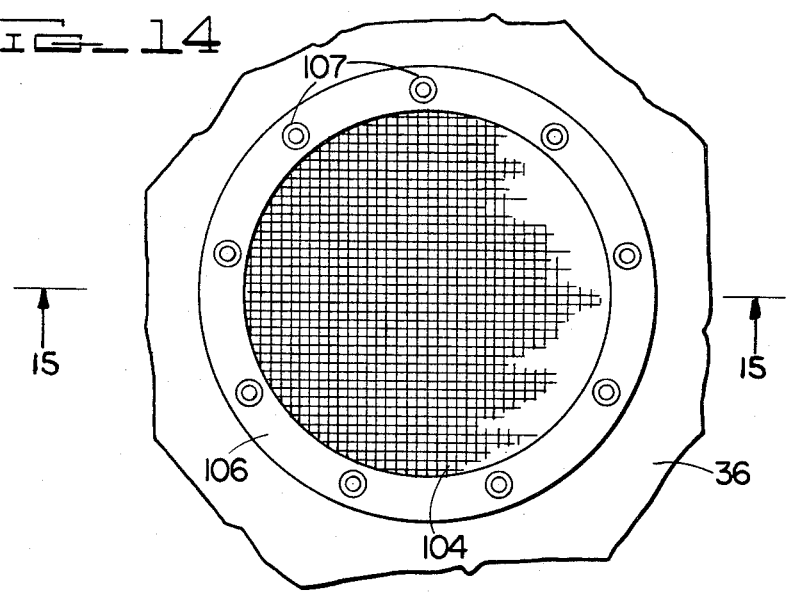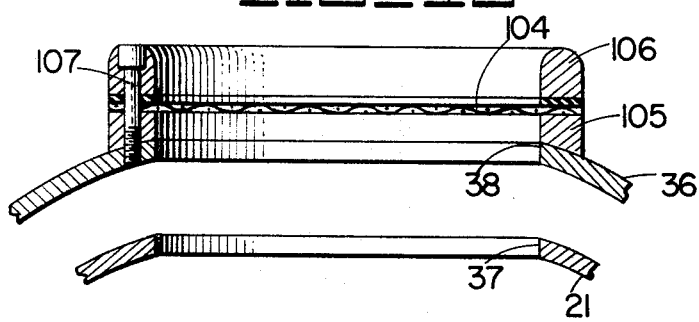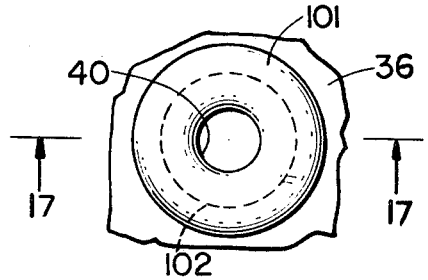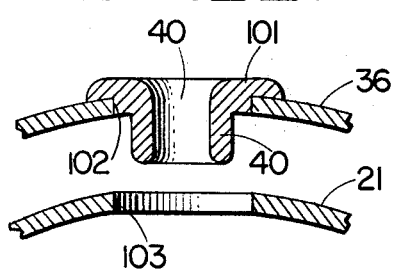
INVENTOR
PHILO T. FARNSWORTH
BY Hood Gust & Irish
ATTORNEYS

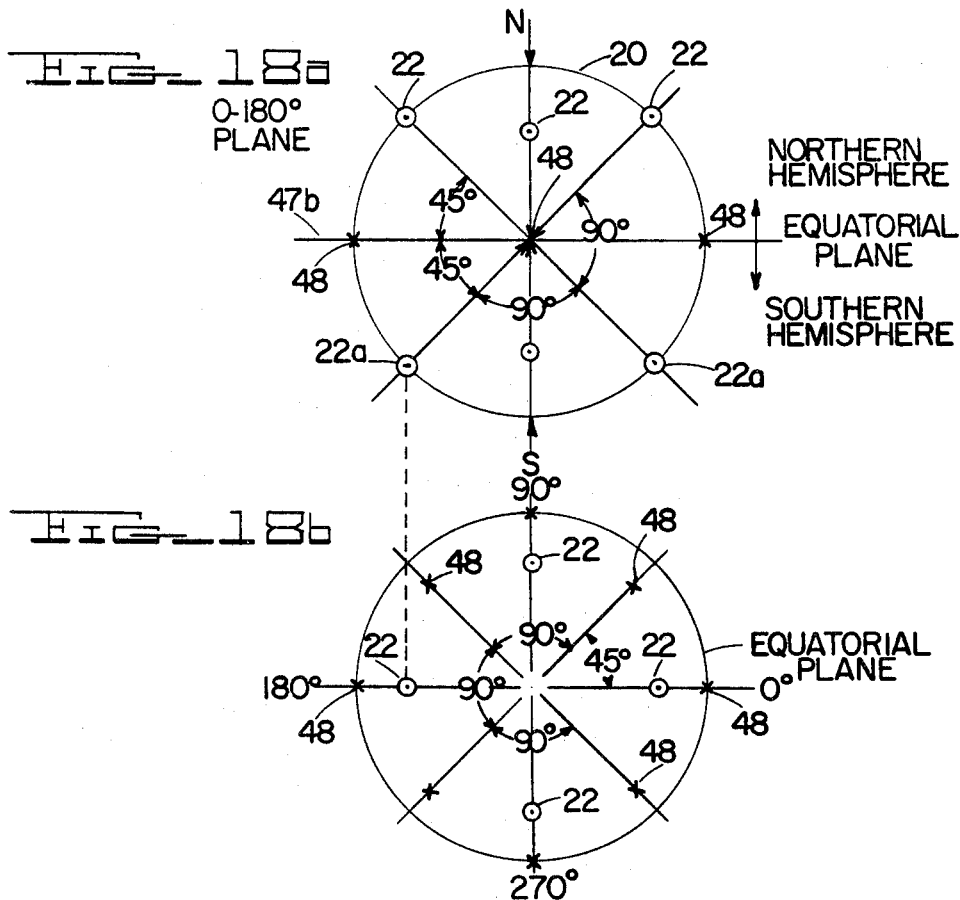
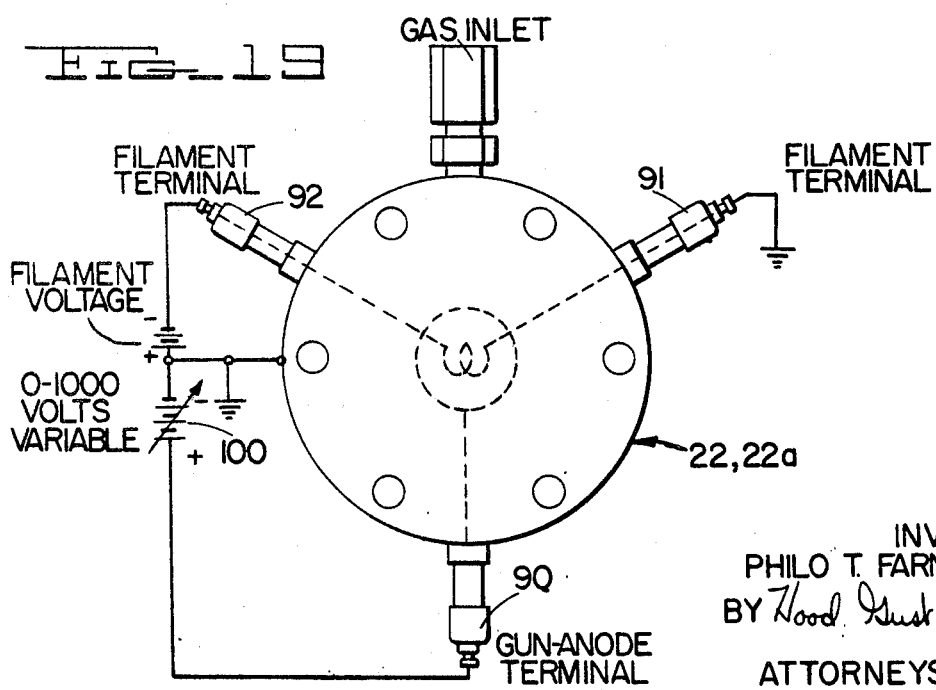

June 4, 1968 P. T. FARNSWORTH 3,386,883
METHOD AND APPARATUS FOR PRODUCING NUCLEAR-FUSION REACTIONS
Filed May 13, 1966 16 Sheets-Sheet 13
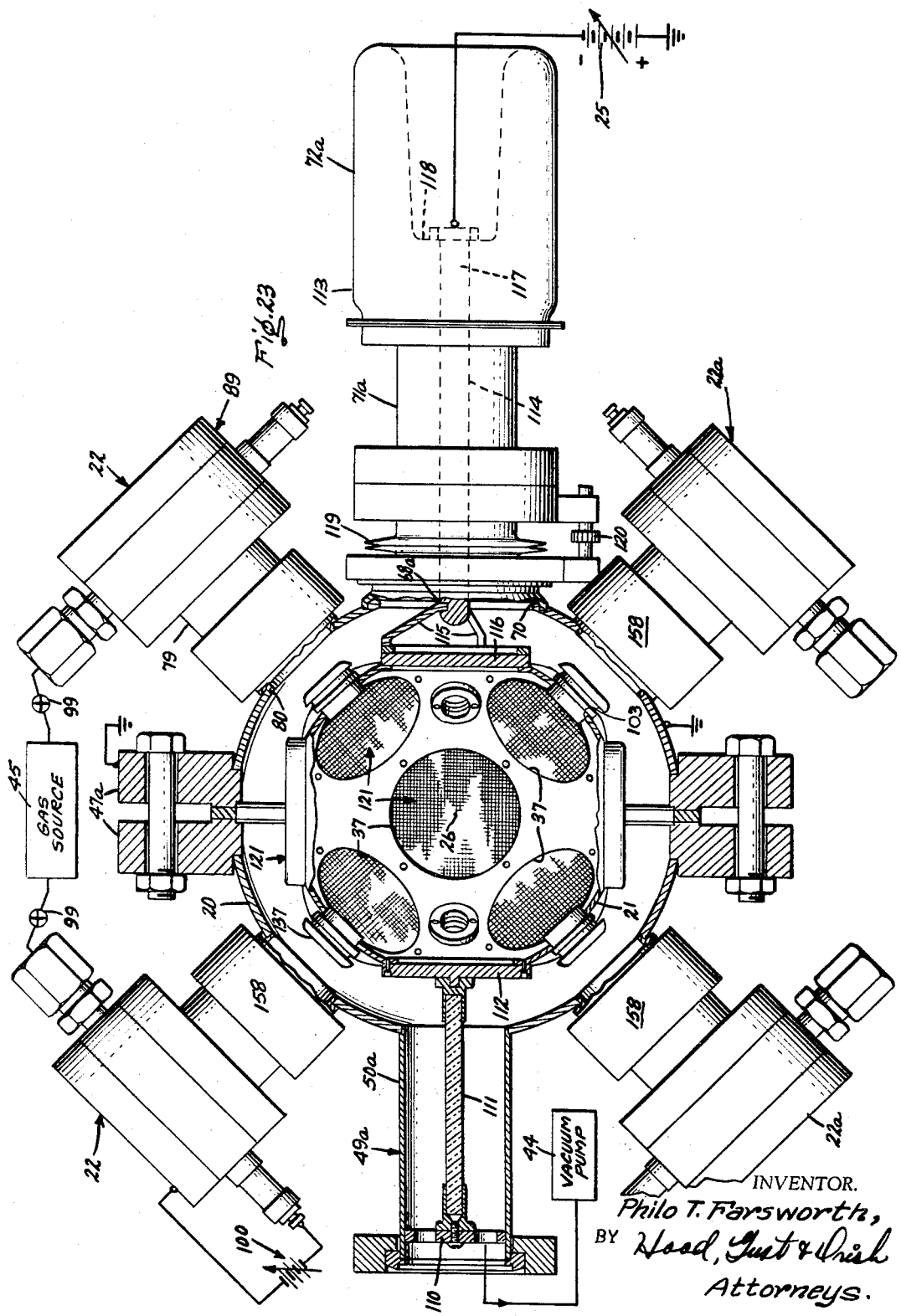
INVENTOR.
Philo T. Farnsworth,
BY Hood, Gust & Irish
Attorneys.

June 4, 1968     P. T. FARNSWORTH     3,386,883
METHOD AND APPARATUS FOR PRODUCING NUCLEAR-FUSION REACTIONS
Filed May 13, 1966     16 Sheets-Sheet 14
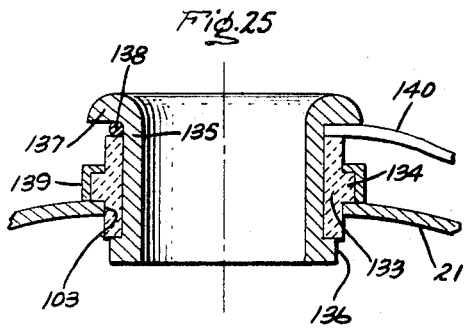
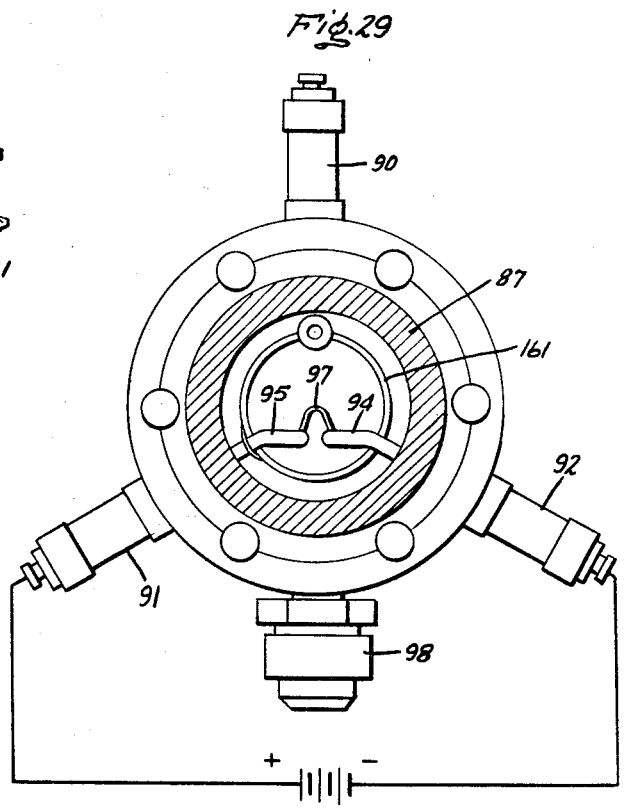
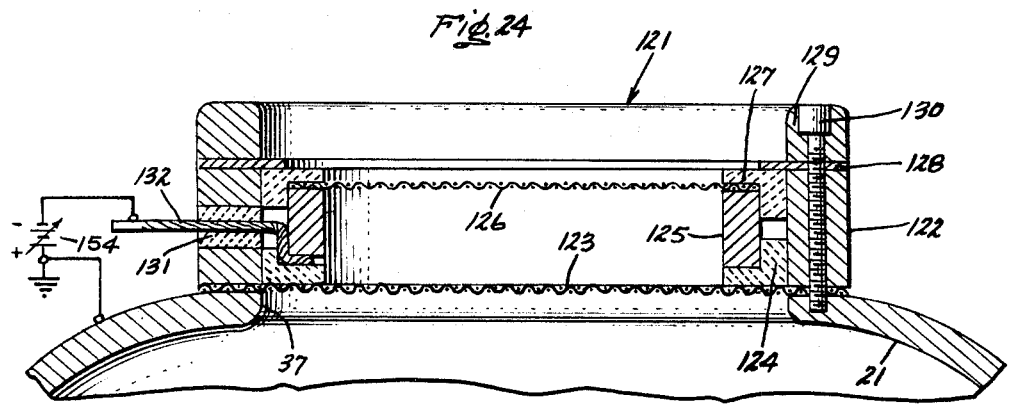
INVENTOR.
*Philo T. Farnsworth,*
BY *Hood, Gust & Irish*
              *Attorneys.*

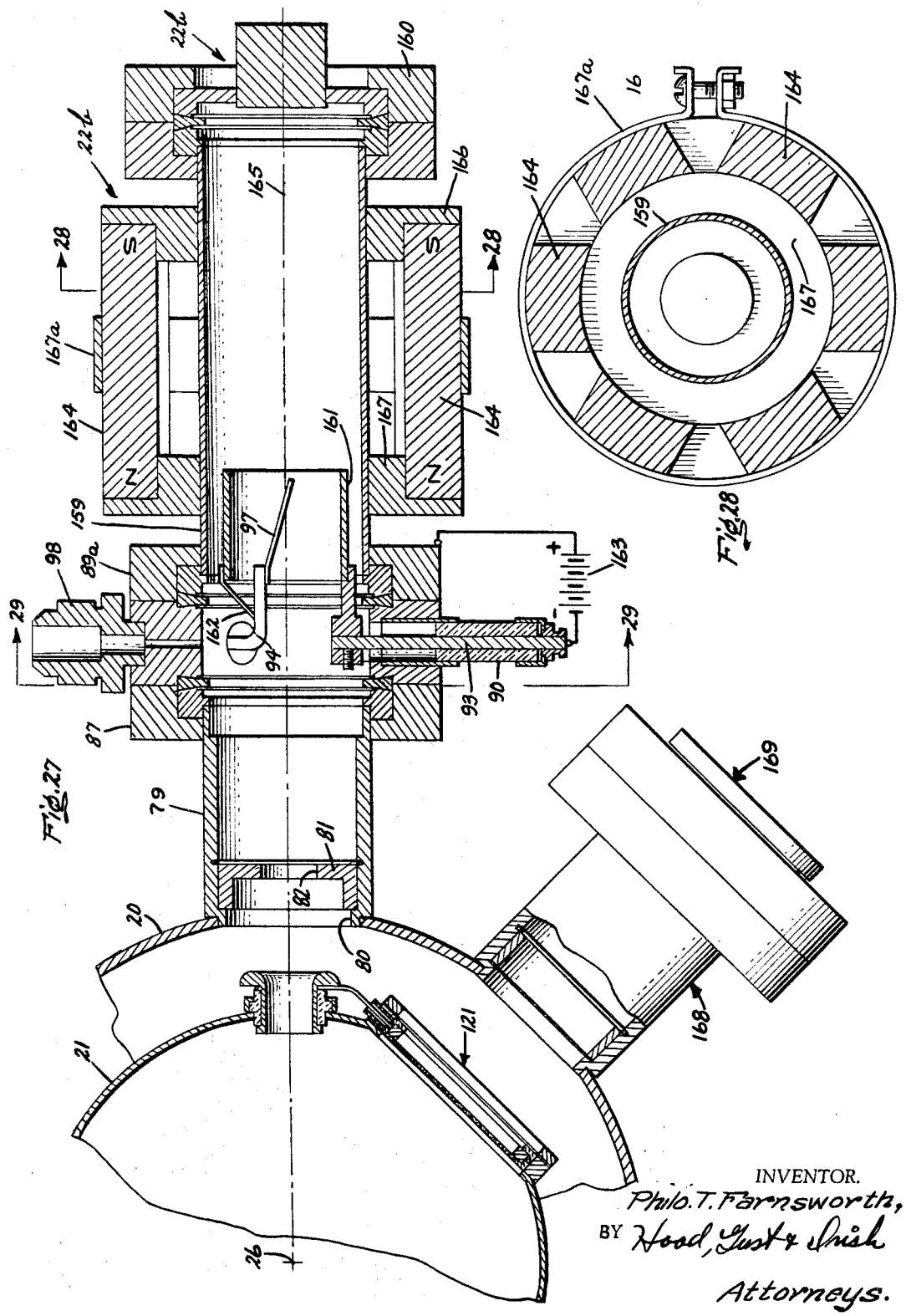

United States Patent Office 3,386,883
Patented June 4, 1968

3,386,883
METHOD AND APPARATUS FOR PRODUCING NUCLEAR-FUSION REACTIONS
Philo T. Farnsworth, Fort Wayne, Ind., assignor to International Telephone and Telegraph Corporation, a corporation of Delaware
Filed May 13, 1966, Ser. No. 549,849
19 Claims. (Cl. 176—1)

ABSTRACT OF THE DISCLOSURE

A method and apparatus for producing controlled nuclear-fusion reaction by use of self-generated electric fields and inertial ionized-gas containment. The apparatus comprises a spherical anode which concentrically surrounds a cathode. A plurality of ion guns are mounted on the exterior of the anode in spherically spaced and diametrically aligned relationship such that the beam axes intersect at the center of the cathode. Appropriate apertures are provided in the cathode for passage of the ions. Other apertures permit passage of positively charged particles outwardly from the cathode interior, but are biased negatively to prevent the flow of electrons into the interelectrode space.

A voltage is applied between the anode and cathode. Ions from the guns are propelled and focused into the center of the cathode establishing in the cathode interior a series of concentric spherical sheaths of alternating maxima and minima potentials called "virtual electrodes." The ions in the innermost "virtual electrode" have fusion energies, and are contained at a density sufficient to produce a self-sustained fusion reaction.

I. Introduction

The present invention relates to a method and apparatus for producing nuclear-fusion reactions, and more particularly to a method and apparatus for producing controlled nuclear-fusion reactions by use of self-generated electric fields and inertial ionized gas containment.

In the well-known fusion reactions, nuclei of two light elements are combined to form a nucleus of a single heavier element, together with a release of the excess binding energy in the form of sub-atomic particles (neutrons and protons). Before the positively charged nuclei can be brought close enough together for fusion to take place, sufficient energy must be supplied to overcome the forces of electrostatic repulsion between them. There are many possible reactions involving the combination of two light nuclei which are accompanied by the release of energy, but hydrogen isotopes (deuterium and tritium) and helium, under the proper circumstances, are considered to be the most likely to produce controllable fusion reactions. Examples of these reactions are:

(1) $_1D^2 + _1D^2 \rightarrow _2He^3$ (.82 mev.) $+ _0n^1$ (2.45 mev.)
(2) $_1D^2 + _1D^2 \rightarrow _1T^3$ (1.01 mev.) $+ _1p^1$ (3.02 mev.)
(3) $_1D^2 + _1T^3 \rightarrow _2He^4$ (3.5 mev.) $+ _0n^1$ (14.1 mev.)
(4) $_1D^2 + _2He^3 \rightarrow _2He^4$ (3.6 mev.) $+ _1p^1$ (14.7 mev.)

It has been determined that to produce a "self-sustained fusion reaction" (release of more energy from the reaction than is required to produce it) the density of the fusionable particles must be maintained at a high order. It is generally accepted that if such a density could be so contained, the other problems involved in producing a self-sustained fusion reaction, principally that of raising the particle energy-levels high enough to overcome their repelling forces, could be solved. Most suggestions and proposals for plasma containment employ very high magnetic fields; these include the pinched discharge, the Stellerator, the magnetic mirror, the Astron, and the like. This invention departs widely from those approaches by utilizing self-generated electric fields for containing the ionized gases. Through the use of such electric fields, many, if not most, of the complex problems inherent in the magnetic-field devices have been overcome.

Methods and apparatus capable of producing such continuous reactions are disclosed and claimed in my application Ser. No. 165,639, filed Jan. 11, 1962, entitled, "Electric Discharge Device for Producing Interactions Between Nuclei," now U.S. Patent No. 3,258,402, issued on June 28, 1966. Generally speaking, one form of the invention of my aforesaid application is of spherical geometry, in which an electron-emissive cathode concentrically surrounds a shell-like anode having an inner concentric cavity or space. The anode is permeable to the flow of atomic particles, while the cathode is not. In operation, an electrical discharge, composed of high-order magnitude electron and ion currents in the space enveloped by the anode, produces a radial potential distribution which is, generally speaking, a minimum adjacent to the center of the anode cavity and a maximum adjacent to the anode wall. Ions created at points intermediate the center and the anode wall fall toward and oscillate through the center at velocities which are dependent upon the operating potentials, the potentials developed within the anodic space and the potentials at which the ions are born. With developed potentials of sufficiently high magnitude, the ions are propelled at nuclear reacting energies, so that ion collisions occur at the center and thus produce nuclear-fusion reactions.

The present invention structurally differs fundamentally therefrom in the respect that the cathode and anode elements are reversed, and the anode therefore surrounds the cathode. The cathode is substantially impervious to the flow of electrons therethrough and is reasonably permeable to the free flow of positively charged particles, while the anode shell is not. An electrical gaseous discharge developed within the device causes the concentration of electrons and ions toward and into the central structureless zone of the volume enclosed by the cathode, thereby producing in said zone concentric, abrupt, shell-like, potential barriers of alternating polarities or virtual cathodes and anodes. High-energy ions within the space of the structure are propelled toward and through these virtual electrodes to the geometric center of the structure, there producing, in concert with the low-energy ions created in that region, an ion concentration of extremely high density. When the space charge in the center fully develops, the potential difference between the innermost virtual cathode and the first adjacent virtual anode reaches a magnitude sufficient to propel ions through the center at fusion-reacting energies. Atomic and sub-atomic products produced by these reactions are available for the production of useful power. The present invention involves novel and improved means and methods for confining the ionized gas particles, regardless of the charge; compressing them into small volumes with high densities; and then maintaining them in a stable condition for a prolonged and continuous period of time.

It is, therefore, an object of the present invention to provide a method and means for compressing and confining an ionized gas discharge by the use of self-generated electric fields.

It is another object of the present invention to provide an electric-field method and means for producing a stable electric discharge.

It is still another object of this invention to provide a method and apparatus for converting the energy released from the nuclear reactions into useful heat energy.

It is another object of this invention to provide a method and apparatus for converting positively-charged particles from the nuclear-fusion reaction directly into electrical power.

It is still another object of this invention to provide a source of electrical power and heat in which the kinetic energy of the products of the nuclear-fusion reactions are converted directly into electrical power with or without accompanying neutrons.

II. Description of theoretical device

In the accomplishment of the above and related objects, an electric discharge device has an anode which surrounds a cathode that electrically encloses a structureless space or volume. The cathode is rendered practically impervious to electrons but reasonably pervious to ions. The anode and cathode are uniquely designed and assembled to form an electron-optical system wherein the cathodic space is maintained completely filled with the electrical discharge. Traversing electrons, under the influence of the electron optice, follow radial-like paths through the cathodic space and, as the cathode is quite impervious to electrons, they are thereby kept from being intercepted in appreciable numbers by the surrounding anode. Electron energy spread is thus maintained at minimum values, and there is developed a high-magnitude electron circulatory current which serves to produce the required potential gradient in the cathodic space.

A variety of fusion reactions are possible, with certain of the reactions being useful in directly generating electrical power. The charged particles of these particular fusion reactions are emitted at sufficient kinetic energies to overcome the decelerating field of the anode. This results in the particles, charged positively, performing work against the anode field, and thereby augmenting the energy stored in that field. The remainder of the energy is converted into heat at the anode, but the deposit of the positive charges thereon results in their conversion directly into electrical energy or power. Energy converted into heat also may be utilized in the generation of power.

The above-mentioned and other features and objects of this invention, and the manner of attaining them, will become more apparent and the invention itself will be best understood by reference to the following description of embodiments of this invention taken in conjunction with the accompanying drawings, wherein:

FIG. 1 is a diagrammatic illustration of an embodiment of the present invention used in explaining the theory of operation;

FIGS. 2 and 3 are potential distribution curves used in explaining the operating principles of this invention;

FIG. 4 is a simplified diagram used in explaining the theory of charged particle scattering;

FIGS. 5a, 5b, 6, 6a, 6b, 6c, 7 and 8 are graphs used in explaining the principles of this invention;

FIG. 9 is a further diagrammatic illustration of an embodiment of this invention (more elaborate than FIG. 1) used in explaining the theory of operation;

FIG. 10 is a graph of the deuterium-tritium reaction used in explaining the operation of this invention;

FIG. 11 is a partial diametral cross-section of a working embodiment of this invention;

FIG. 12 is an axial section of one part of the terminal and supporting structure for the embodiment of FIG. 11;

FIG. 13 is a fragmentary axial section of one ion gun of FIG. 11;

FIG. 14 is an enlarged fragmentary plan view of a cathode biasing screen assembly of FIG. 11;

FIG. 15 is a cross-section taken along section line 15—15 of FIG. 14;

FIG. 16 is an enlarged fragmentary plan view of an ion aperture assembly of FIG. 11;

FIG. 17 is a cross-section taken along section line 17—17 of FIG. 16;

FIGS. 18a and 18b are diagrams used in explaining the relative positions of the ion guns and the screen-covered apertures in the cathode;

FIG. 19 is an end view of an ion gun;

Figure 26:
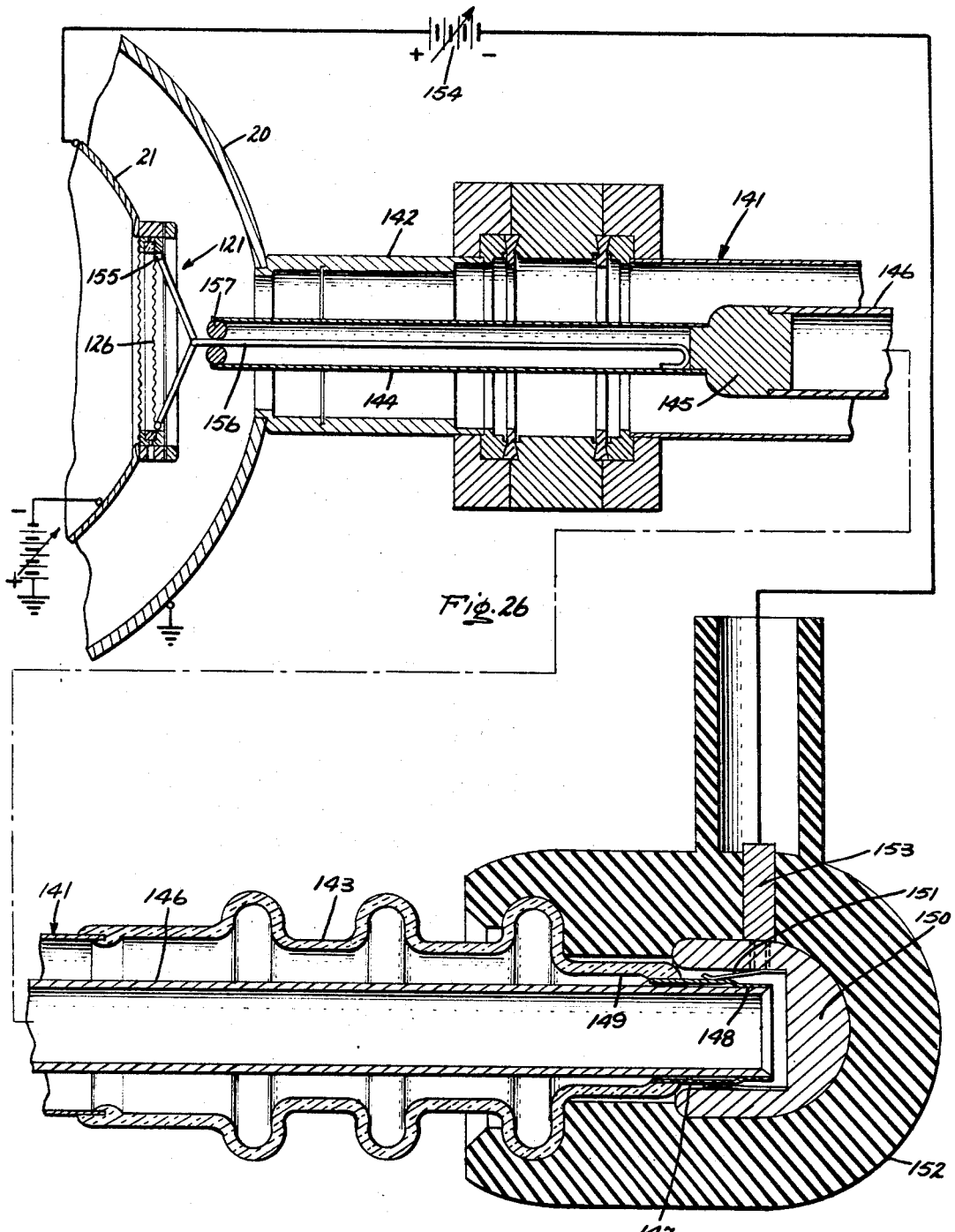

FIGS. 20 and 21 are cross-sections taken along section lines 20—20 and 21—21, respectively, of FIG. 13;

FIG. 22 is a cross-section taken along section line 22—22 of FIG. 11;

FIG. 23 is a partial cross-section of another working embodiment of this invention;

FIG. 24 is an enlarged fragmentary cross-section of the biasing screen assembly mounted on the cathode shown in FIG. 23;

FIG. 25 is an enlarged fragmentary cross-section of the ion-aperture assembly mounted on the cathode shown in FIG. 23;

FIG. 26 is an enlarged fragmentary cross-section of the terminal assembly for applying the biasing voltage to the biasing screen assembly of FIGS. 23 and 24;

FIG. 27 is an enlarged, fragmentary sectional view of another embodiment of an ion gun assembly;

FIG. 28 is a cross-section taken substantially along section line 28—28 of FIG. 27; and FIG. 29 is a cross-section taken substantially along section line 29—29 of FIG. 27.

III. Simplified explanation of operation

It has been accepted that fusion reactions, which will yield more energy than that supplied to produce the effect, will occur only in high-density plasmas in which the overall kinetic energies of the ions composing the gas are high enough to overcome their mutual repelling forces. Most approaches proposed or under study to produce these conditions employ powerful external magnets to contain and compress the plasma into a small volume to increase the density and temperature (energy) of the particles therein. Such magnetic fields thus far have been successful in confining the plasma particles in the required high-density configuration for only extremely short (microseconds) fusion reactions. The time required to produce the favorable conditions (interval between pulses) is so great that energy output is extremely small when compared with the energy input.

This invention differs fundamentally from those in that charge-particles are compressed into a suitably dense configuration through the action of an "electrodynamic lens" established by confined bi-polar charges in a volume of free space. Such bi-polar charges are developed into a spherical configuration in such a way as to establish a plurality of concentric spherical potential sheaths radially spaced, these sheaths having large potential differences therebetween. The maxima and minima potential sheaths alternate radially and are characterized, respectively, as virtual anodes and cathodes. A virtual cathode is innermost and substantially coincident with the geometric center.

From this arrangement to virtual anodes and cathodes, a radial potential distribution obtains in a spherical space, with one potential minimum being near the center. Thus positively charged particles in this space fall toward and through the center; hence, in effect they are focused onto the center. The focusing forces may be considered as resulting from bi-polar (electron-ion) charge optics.

Bi-polar charges moving radially within the space produce a radial potential distribution as described above. It is, therefore, convenient to characterize these bi-polar charge optics as "Poisson Optics" inasmuch as the solution of Poisson's differential equation (given later on) for the radial potential distribution resulting from bi-polar charges in a spherical configuration reveals the phenomenon of the aforedescribed virtual anodes and cathodes. The electric field which obtains within this free space occupied by these virtual electrodes I call a "poissor."

The trajectories of the charged particles are determined by the composite field or poissor which is produced by the aggregate of the fields of the oppositely charged particles. When a positively charged particle (ion) of zero velocity falls from a point just inside a virtual anode (which defines a spherical positive-potential boundary), it is accelerated toward the adjacent virtual cathode and, in passing beyond it, decelerates toward a condition of zero velocity at an equipotential boundary of that from which it started, and then repeats this velocity rate of change from zero to maximum, and then again to zero in the opposite direction. Electrons likewise will oscillate through virtual anodes between negative equipotential barriers. Since one polarity of charged particle approaches its maximum velocity while the other polarity approaches its minimum, the two species maintain their separate identities and spaced charges. Hence, it is seen that the particles are trapped inertially between such equipotential boundaries; accordingly, I call my method for containing the nuclear-fusion reacting particles "inertial containment." The ions which are created on the inward sides of the boundaries of the spherical virtual anodes and which oscillate through or near the center of the device produce the required density thereat to satisfy the conditions for a self-sustaining nuclear fusion reaction. Thus, the charged particles are literally compressed into the required density in the central region by the process of inertial containment, and the present device utilizes this process.

Referring to the drawings, and more particularly to FIG. 1, an evacuated spherical electron-tube structure is shown which comprises a spherical, anode shell 20 at radius $r_a$, enclosing a sperical, cathode shell 21 of radius $r_c$, and an ion gun 22 which is mounted on the outside of the anode 20 as shown. The anode and cathode electrodes are concentrically arranged as shown. The cathode 21 and its field are substantially impervious to electron flow to the anode 20, but is pervious to the flow of positively charged particles such as ions. In this theoretical exemplification, the cathode 21 may be considered as an open-mesh electrode formed of metallic screen or the like, which is constructed of a material, the surface of which emits electrons upon bombardment by ions or electrons and preferably is photoelectric in the ultra-violet spectral region. Suitable connections are made to the electrodes, a lead 23 being connected to the anode 20 for applying a positive potential thereto and another lead 24 being connected from the cathode 21 for connection to a negative potential terminal. A power source, such as a battery 25, delivering a suitably high voltage is connected as shown to the leads 23 and 24. In the preferred embodiment of this invention, the anode 20 is operated at ground potential.

In one embodiment of this invention, ions of a suitable nuclear-fusion reactive gas are introduced into the space enclosed by the cathode 21. An electrical discharge composed of high-magnitude electron and ion currents forms in the cathodic volume and develops a difference of potential which is, generally speaking, a minimum near the geometric center 26 and a maximum adjacent to the anode 20, with one or more potential maxima (virtual anodes) and minima (virtual cathodes) concentrically enclosed within the cathode 21. Ions created at points adjacent to potential maxima (virtual anodes) fall toward and oscillate through adjacent potential minima (virtual cathodes) with energies equivalent to the potentials at the points where they start their journeys. These ions, falling inwardly toward the center 26 from regions of high potentials, will be propelled at velocities (energies) which are sufficient to overcome the repelling forces of other high-energy ions and also the slower (target) ions born in the region near the center 26 and collide, thus producing nuclear-fusion reactions.

In order to obtain ions with fusion-reacting energies, the sizes of the virtual cathodes and anodes must be maintained such that the boundaries thereof are well defined, and the potential differences therebetween are pronounced. This is achieved by methods which are explained in detail in the written description later following.

IV. *Description of poissor (virtual-electrode system) formation*

With suitable potentials applied to the electrodes, and with the ion gun 22 energized, ions of a fusion reactive gas are directed into the space enclosed by cathode 21, where they will be accelerated radially inwardly toward the geometric center 26. Since there is a potential gradient between the anode 20 and cathode 21, the positively charged ions, as indicated by the numeral 27, will be accelerated by the cathode 21. Inasmuch as the latter is substantially ion permeable, each ion 27 will continue its transit and, if the optics are considered to be perfect, it will pass through the center 26 and travel onwardly in a straight line until the repelling field of the anode 20 at about the point 28 is reached. At this point, the direction of travel of the ion will be reversed, and it will repeat the diametric excursion to the opposite side of the device adjacent to the anode 20, passing through the center 26 enroute.

Because the potential within the cathode is uniform (assuming no other ions or electrons are in existence), ions 27 will experience no velocity-changing force while traveling therethrough. Thus, an ion may be considered as starting its travel at or near a given point on the anode, accelerating toward the cathode, traveling with constant velocity through the cathodic space, and then decelerating from the cathode to the vicinity of the anode where its velocity becomes zero and it reverses its direction of travel. This ion will continue its oscillatory motion until it is lost by one of several competing actions, which will be explained later on. The significance of this single-ion concept is two-fold: firstly, it recognizes that the normal space potential inside cathode 21 is uniform at the value of the cathode, and an ion traveling thereacross does so with uniform velocity; and secondly, that the ion will oscillate within the space enclosed by anode 20 until ultimately collected by the cathode 21.

Now let it be assumed that two ions leave the anode simultaneously from diametrically oposite points, such as from ion guns 22 and 22*a*. Each of these ions will be propelled radially inwardly toward the exact center 26 of the cathodic space so that they would collide at that point in the absence of any other forces. Inasmuch as each ion is positively charged, it will exert a repelling force upon the other, such that their respective velocities will be progressively decreased until they nearly reach the exact center 26, where they will have given up all of their energies and stop. Under the repelling influence of their respective fields, they will reverse their direction of travel and be accelerated outwardly. In a practical embodiment, however, the ions will experience a diverting effect and will pass each other at minimum velocity rather than stopping. Upon passing through the cathode 21, the ions will be decelerated by the anode 20 field until they stop adjacent to the anode 20, whereupon the cycle is repeated. Even though the unipotential space inside the cathode 21 exerts no force on a single ion passing therethrough, two ions approaching each other along a diametral path experience coulomb repulsion and velocity changes which serve to create a positive electric field in the cathodic space, the maximum effect occurring in the central region where the velocity is the least. This may be properly described as a space-charge effect.

Now assume that a copious quantity of ions are introduced into the space immediately adjacent to the anode 20 from a number of symmetrically disposed ion guns. These ions will converge toward the center 26 at progressively decreasing velocities until they reach a minimum velocity and thereafter diverge outwardly along essentially the same diameters, accelerating until they pass out through the cathode 21. The ions contribute a positive charge to the cathodic space which increases progressively as the coulomb forces become effective and reach a maximum within center 26; as the ions leave the center 26, they absorb energy from that field on their passage to the cathode 21. Thus, surrounding the cathodic center 26 (and inside the cathode 21), a virtual anode will be produced which can be made to have a potential which can exceed that potential ($V_a$) of the anode 20 by a factor $\Delta V_a$ equal to the average voltage increase which is required by the ions from the ion guns to penetrate the anode 20 field. The ions, therefore, oscillate back and forth through the permeable cathode 21 until lost by one of several competing actions which will be explained later, since they do not re-enter the anode 20.

The establishment of the ion space-charge inside the cathode 21 may be better understood by reference to the graph of FIG. 2 wherein the abscissa represents the radius of the device and the ordinate represents the potential distribution therein. The magnitude of the ion space-charge is dependent upon the amount of space-charge current flowing in the cathodic space. For a minute quantity of current, the positive charge contribution is small, and the potential at the center would appear as shown by curve $a$. A larger current will produce a more positive potential distribution such as curve $b$. Greater or lesser currents will change the potential at the center 26 correspondingly.

Since the cathode 21 is not completely permeable to the flow of ions therethrough, ions will impact it and dislodge secondary and Auger neutralization electrons thereby. (During operation of the device, electrons also will be supplied from the photoelectric cathode 21 by ultra-violet radiation from Bremsstrahlung and recombination.) Electrons, to be able to leave the cathode 21, must be excited to a potential ($V_c + \Delta V_c$), $V_c$ being the potential of the cathode 21. The electrons so emitted by cathode 21 will leave with a Fermi-Dirac distribution of velocities and the potential gradient near the cathode 21 thereby becomes more negative by the factor $\Delta V_c$ than that of cathode 21, and the potential curve moves down until it has a minimum at a radius $r_{c_1}$, close to that of the cathode 21, at which the potential corresponds to the average velocity of emission. For this condition, most of the electrons are slowed down until they come to rest, thus creating a virtual cathode 29 at a radius $r_{c_1}$, and from which the electrons may flow in either direction, i.e., either return to the cathode 21 or flow into the central cathodic volume.

Some electrons, under the attractive influence of the positive potential gradient (virtual anode) created in the central volume by the ions and the repelling influence of the virtual cathode 29, will be accelerated toward the center 26 until their mutually repelling coulomb forces predominate. They then will be decelerated, giving up kinetic energy to the field, and ultimately may be scattered through large angles, returning to the virtual cathode 29, where they will repeat the cycle. Since the electron density is the greatest in the small spherical volume enveloping the center 26, the negative space-charge contribution by the electrons will be the greatest in that region and a potential minimum or a crater will develop in the center of the positive gradient $b$ (FIG. 2) which will increase in depth until a virtual cathode 30$a$, with a potential equal to that of virtual cathode 29, is created at the center 26, radius $r_0$. This action is accompanied by an outward displacement of the peak of the positive potential gradient to a radius $r_{a_1}$, where a spherical potential sheath or virtual anode 31 is formed.

The description thus far has disregarded the presence of neutral gas molecules within the device. When neutral gas is present, it initially will be distributed equally throughout the volume enclosed by anode 20. The electrons and ions oscillating within the cathode 21 space will strike the neutral gas molecules, creating additional electrons and ions which, under the influence of the electric fields, will be set into oscillatory motion, the lengths of their respective paths being determined by the potentials at the points within the cathodic space where they were created. For example, suppose an ion is born in the outward (cathode) side of the virtual anode 31 (FIG. 2); it will be propelled through the virtual cathode 29 and impact the cathode 21, thereby producing additional electrons. The electron which was released during the creation of the ion will pass through the virtual anode 31, and be brought to rest in the vicinity of the virtual cathode 30$a$ where, neglecting any deviation, it will reverse its direction and return to the point where created. Now suppose the ion and electron were created on the inside of virtual anode 31 (FIG. 2). The ion will move inwardly, being accelerated toward and through the virtual cathode 30$a$, and will come to rest at the positive barrier on the opposite side of the center 26, and then oscillate between those barriers. The electron will be propelled through the virtual anode 31 and will go into oscillation between the virtual cathode 29 and the virtual cathode 30$a$. By far the greatest number of ions (and electrons) will be produced near the virtual cathode 30$a$, because the probability of ionization by electron impact is greater the slower the electron and because the electron density is the greatest in the virtual cathode.

As the process continues, the ion and electron space currents tend to build up a small positive potential maximum within the virtual cathode 30$a$ (FIG. 2) by virtue of the ions that are created in that region and which oscillate through it. Thus, a vestigial virtual anode 32 (FIG. 3) is formed in the center 26, and the virtual cathode 30$a$ moves to a new location 30 at radius $r_{c_2}$. When neutral gas molecules are present in the virtual cathode, ionization will occur. The electrons so created will be nearly indistinguishable from and react in the same manner as those in the virtual cathode, i.e., they will be accelerated outwardly toward a virtual anode. The associated ions will be born with the very low kinetic energy of the neutral particles and therefore will remain in the vicinity of the virtual cathode, neutralizing some of the space charge. These combined actions of electrons and ions will result in smaller negative space charge which decreases the radius of the virtual cathode. The new radial potential distribution is shown in FIG. 3. It will be noted that an increase in the electron space-charge current within the virtual anode 32 could result in the formation of a new virtual cathode therein. This process of adding virtual electrodes, theoretically, could continue until a point of confusion is reached where they merge and the field collapses. In actual practice, however, the number of virtual electrodes in a poissor may, and will, be controlled. In the practical exemplifications described herein, only two virtual cathodes (29 and 30), one virtual anode 31 and the vestigial anode 32 will be assumed to exist.

It must be borne in mind that in an actual operating device neither the ions nor the electrons are traveling precisely radially; moreover, there is a velocity spread within both the ion and electron groups due to interparticle scattering. As a result, the points where ions and electrons reverse their direction of motion do not lie on mathematically thin surfaces; accordingly, the virtual anodes and cathodes have finite radial thicknesses which are called "potential gradient sheaths" or simply "sheaths."

At this point, it will be appreciated that the space charge buildup inside the cathode 21 has resulted in the development of concentric potential gradient sheaths which serve in confining negatively and positively charged particles to movement in paths, almost all of which intersect at the center 26, while others oscillate along path lengths which are determined by the energy levels at which the charged particles were created. When a high kinetic energy ion (projectile) passes near a low kinetic energy ion (target)

in the central volume, scattering occurs. An energy transfer takes place therebetween which sets the target ion into oscillation and tends to trap the projectile. The positively charged particles for fusion reactions thus are compressed into such a densely packed volume concentric with the geometric center 26 that the probability of those particles being fused is high.

The manifestation of a poissor (virtual-electrode system) by radiation of light within spherical geometries similar to the device described above has been observed through viewing ports and studied photographically, on many occasions.

V. *Other atomic processes in the discharge*

In the immediately preceding discussion, the ions and electrons have been considered as moving past each other, interacting only through their respective space charges. There are a number of other atomic processes which can occur, however, and it will be shown in the following that the design of the apparatus can be such as to minimize some of these effects and use others to good advantage.

As has already been explained, the high-energy ions or electrons, in the absence of outside influences, would oscillate radially through the space of the anode 20 or the cathode 21 (FIG. 3). The ion transit time between the limits of its travel, i.e., the time which an ion takes for one traversal of its path, is proportional to the ion path length and inversely proportional to its average velocity. This ion oscillatory action will, in the presence of electrons and neutral gas, continue only until one of four possible actions occurs:

(a) the ion path is altered by the "scattering process";
(b) the ion "captures" an electron from a neutral atom, called charge exchange, or recombines with an electron and becomes a neutral atom;
(c) the ion is fused by a nuclear reaction; or,
(d) the ion is captured by the cathode or the anode wall.

A scattering event is a collision of or near collision of two or more particles in which the energies and momentums of the individual particles are altered, but total energy and momentum are conserved. In an ionized gas, ion-ion scattering and electron-electron deflections from coulomb forces are of primary importance because energy is most readily transferred between particles of similar masses. Electron-ion deflections involve much less energy transfer because of the large mass difference between the two species.

"Scattering" is the total statistical effect of the probability of electrostatic deflection of like particles with both radius and distance as variables; i.e., the deflecting of particles of like charge by the coulomb repelling forces. Ion scattering takes place mostly in the virtual anodes where the kinetic energies are low and the ion densities are many fold greater than anywhere else along the ions' paths. Scattering in the virtual anodes cannot result in a large energy transfer. When an ion is scattered in a virtual anode and is accelerated toward a virtual cathode, it gains high kinetic energy and its path is essentially radial. (As the ions and electrons are oscillating within a spherical enclosure, their current densities increase radially inwardly as $1/r^2$ where $r$ is the distance from the geometric center 26 to the point where the density is measured.) An ion will be deflected from its path as it approaches another ion if it is unable to approach closely enough (within the radius of fusion, $r_f$) for the sub-atomic attractive nuclear forces to predominate. This particular distance between two ion ($r_f$) where scattering is replaced by fusion, can be calculated if the fusion cross-section for the particular ion is known. For example, if we assume that the fusion cross-section ($\sigma_f$) for tritium ions with deuterium ions is:

$$5 \times 10^{-24} \text{ cm.}^2$$

then $$\pi(r_f)^2 = \sigma_f = 5 \times 10^{-24}$$

(5) $$r_f = \sqrt{\frac{5 \times 10^{-24}}{\pi}} \simeq 1.26 \times 10^{-12} \text{ cm.}$$

If scattering is too great, it will not be possible to maintain the high ion density at the center 26 necessary to assure the required fusion probability. In other words, the effect of scattering is to increase the size of the minute volume of the central vestigial virtual anode 32. Thus it becomes advantageous to limit the number of ion trips through the center, for a given particle energy, in order to prevent an increase in that volume by scattering.

The deflection angle will depend upon how closely the two ions approach each other, this angle being directly proportional to the density of the target ions bound within the innermost virtual cathode 30 (FIG. 3) and inversely proportional to the square of the energy of the scattered ion. Ions which approach each other at a distance less than $r_f$ will fuse; those that are unable to close within that range will be deflected. The scattering angle will be greater the closer the ions come to each other. The critical angle where fusion occurs, called the "angle of fusion," can be calculated using Rutherford's formula. Neglecting multiple scattering for the tritium-deuterium ions, this angle turns out to be 58°; thus, scattering will take place only when the angles are less than 58°. It can be shown mathematically that the probability of the scattering angle exceeding 8° is only about 10%.

As an ion has a much shorter wavelength than an electron, its atomic dimensions are much smaller. Two important consequences follow:

(a) Diffraction effects will not occur in elastic scattering. Thus, over a major part of angular range, elastic scattering will be the same as that given by the classical theory. (At very small angles, the quantum theory will give better results.)

(b) Elastic scattering will be confined to very small angles. The scattered intensity will decrease with an increase of scattering angle, and the scattering is concentrated to small angles as the incident energy is increased: the total scattering will decrease with increasing energy.

For elastic collisions, the cross-section will be small if:

(6) $$\frac{r}{v} \times de \gg \frac{h}{2\pi}$$

where $de$ = ionization energy
$h$ = Planck's constant
$v$ = velocity of the ions
$r$ = radius of ion deflection The greater the value of $de$, the greater will be the energy at which maximum inelastic cross-section will occur. Because of small values of $de$, charge-exchange is the most important inelastic collision process.

An ion can be neutralized by an encounter with an electron. This can happen in two different ways: an ion can collide with a neutral atom and rob it of its electron ("charge-exchange"), or the ion may collide with the free electron and recombine to form a neutral atom. The probability of recombination is extremely unlikely compared to charge exchange (see Brown, "Basic Data of Plasma Physics," Wiley, 1959, page 104) and will occur only if the two colliding particles are traveling in the same direction at about the same velocity. Since the charge-exchange cross-section is greater than $10^{-16}$ cm.$^2$ between 1 kev. and 50 kev., charge exchange will occur over a wide range. The gentler the slope of the potential gradient, the longer will be the ion path length within which charge-exchange can occur. The only region in which recombination can occur is close to the virtual cathodes 29 and 30 where the electron velocity is lowest and ion velocity is highest.

When charge-exchange occurs, there is very little energy transfer between the two particles other than the transfer of an electron from one nucleus to the other. The old ion, which becomes a neutral atom, retains almost all of its velocity, and, since it is no longer influenced by the electric field, it simply travels onwardly until it is lost at the tube wall. The newly formed ion has the energy corresponding to the potential at the point in space where it was created. It begins an oscillatory motion of its own through the center 26, or travels to the cathode 21 with no indication of having been previously deflected. The newly formed ion may be considered to be continuing to increase the average number of trips started by the old ion, but with the disadvantage of having suffered an energy loss. The ion charge-exchange cycle of the inner side of the virtual anode 31 may be repeated several times before the energy loss becomes so great that fusion will not occur.

When recombination occurs, a neutral atom results, which travels outwardly until it is either reionized by another electron or ion or migrates to the tube walls. Recombination results in a loss of energy through radiation as well as a loss of both ions and electrons from the space charge; it is fortunate that the probability of this event occurring is so low and thus represents a negligible energy loss. This condition is achieved by maintaining the paths of the electrons as nearly radial as possible. One means for obtaining this radial motion is to hold the velocity spread of the electrons to a minimum.

*Control of charge-exchange by limiting ion trips*

Ion scattering will be limited if the number of ion trips through the center of the device can be limited. It will now be shown that this number of ion trips hence charge-exchange can be controlled.

The extent of charge-exchange may be calculated from the relationship which expresses that probability per trip $P_c$ as follows:

(7) $$P_c = \rho_n \times \sigma_c \times L$$

in which:

$L$ = the length of one ion path in centimeters;
$\rho_n$ = the neutral gas density in particles per cubic centimeter; and
$\sigma_c$ = the charge-exchange cross-section in cm.$^2$.

The highest possible value for $P_c$ is unity (1), since this means that the event of charge-exchange occurs. The obvious minimum value of $P_c$ is zero (0). From the formula, if the calculated value for $P_c$ is $10^{-6}$, this means that an ion makes on an average $10^6$ oscillatory trips before the energy loss of the ion by charge-exchange becomes so great that it will not be able to reach a fusion radius. Values for charge-exchange cross-section may be obtained from the curve of Jackson & Schriff in "Physical Review," vol. 89, No. 2, page 359, 1953.

In the case at hand, it is desirable to limit the number of ion trips to less than one million during the occurrence of from four (4) to six (6) charge-exchange cycles. If an average of four (4) captures per $10^6$ is assumed, then:

$$P_c = \frac{4}{10^6} = 4 \times 10^{-6}$$

Now assuming as an example that the path length is 0.135 centimeter and the value of $\sigma_c$ is $10^{-16}$ cm.$^2$, then the value of the neutral gas density $\rho_n$ may be derived from Equation 7 as follows:

$$\rho_n = \frac{P_c}{\sigma_c \times L} = \frac{4 \times 10^{-6}}{10^{-16} \times 0.135} = \frac{1}{250,000 \times 10^{-16} \times 0.135}$$

$$\simeq 3 \times 10^{11} \text{ particles/cm.}^3$$

Thus, it is readily observed that the control of charge-exchange, which in turn governs to a major extent the shape of the potential distribution, is achieved by adjustment of gas density as charge-exchange cross-section is inversely proportional to gas density. Thus it is desirable to work at the lowest practicable gas density.

*Maintaining radial thinness of virtual cathode by controlling electron scattering*

During space charge build-up, electrons initially have energies for oscillating within the confines of the cathode 21 along radial paths which pass through the center 26. These electrons suffer the same type of deflective forces as approaching ions, such that meeting electrons scatter. Electrons approaching each other at or near the center 26 deflect along different paths which are also radial. However, if the electrons should meet at points other than the center 26, they will deflect along new paths which may become either more radial or less radial. As the electron transits continue, the non-radial electrons can and do meet with other electrons, producing further non-radial and radial electrons such that eventually, after a relatively large number of electron transits, electron movements inside the cathode 21 tend to become, in some measure, non-radial. FIG. 4 shows a simplified example of this deflection for two different locations of an electron (33 and 34) with respect to an electron traveling along a non-radial path. In FIG. 4, the electron 33 is deflected along the new (and radial) path, while electron 34 is deflected along a more non-radial path. If the deflection angle is large, some of the electrons could, unless otherwise prevented, acquire sufficient energy to penetrate the virtual cathode 29 and the cathode 21 and be absorbed by the anode 20 or to enter the cathode 21 and thus be removed from the field; others will accumulate orbital momentum.

The required condition for producing sharply resolved virtual anodes and cathodes is initially achieved by controlling the number of electron trips within the cathodic space. This condition may be represented by the equation:

(8) $$I_e = 2\bar{N}_e \times i_{e2c}$$

where $I_e$ = the circulatory electron current through the virtual anode 31 inside the cathode 21 (FIG. 3),
$i_{e2c}$ = the electron current emitted from the inner surface of the cathode 21 (FIG. 3),
$\bar{N}_e$ = the average number of electron trips ($2\bar{N}_e$ is the average number of round trips).

If a particle's path is through the center, the distance from its starting point to the point where it commences its return journey is the equivalent of two trips or one "round trip." Where the path of the particle is away from the center, the distance from its point of origin to its reversal point is one trip. It is desired that the factor $\bar{N}_e$ fall somewhere between the figures of $10^3$ and $10^4$. If $\bar{N}_e$ becomes too large, the virtual cathodes and anodes will not form properly. Thus, by preventing the number of electron trips from becoming excessive, the non-radial component of the electron space-current can be held to a minimum.

The number of electron trips may be made relatively small by maintaining a high electron current density within the cathodic space. Since the maximum value of the circulatory electron current $I_e$ is limited by space-charge saturation, which is a function of the cathode voltage gradient, $I_e$ (Equation 8) may be made to approach its saturation limit by increasing the cathode current $i_{e2c}$, thereby confining a very large number of electrons within the cathode 21 which make but few round trips. Accordingly, few orbital electrons will be formed. In a practical device, the electron current can be increased by the use of electron emitters within the cathode 21.

The paths of the orbiting electrons are elliptical, and each such electron is therefore subjected to a precessional force which causes the electron's path to sweep a spherical surface inside the cathode. These electrons contribute to the electron circulatory current and also to the fields of the virtual cathodes. Because of their elliptical paths, with non-radial velocity components, orbital electrons cannot approach the virtual cathodes as closely as radial electrons. Thus, their maximum space charge contributions occur farther from the virtual cathodes than those from radials, and the virtual cathodes will tend to be displaced inwardly. Excessively large numbers of orbital electrons (greater than 10% of the electron circulatory current) therefore are undesirable as they prevent the maintaining of sharply defined virtual electrodes. In actual practice, the orbital electrons appear not to exceed that limit.

Orbital electrons, in addition to their contribution to the electron circulatory current, further reduce the probability of recombination. In the fusion-reaction volume enclosed by the virtual cathode 30, this becomes extremely important as it greatly reduces the loss of fusion-reactive ions from that region. In the region outside of the virtual cathode 30, the orbital electrons, as previously shown, not only contribute to the field which maintains the virtual cathode 29, but also displaces that cathode inwardly toward the virtual anode 31 and thereby reduce greatly, any cusps or singularities in the electric field pattern of the virtual cathode 29 produced by the anode 20 field penetrating through the apertures in the cathode 21.

VI. Particle flow

Further consideration of the process involved in the present invention requires investigation of the space-charge optics and the particle flow. The laws by which charged particles move from an emitter to a collector without regard to the direction of voltage between electrodes have been described by Langmuir and Blodgett ("Physical Review," vol. 24, No. 1, pp. 49–59, June 1924), That particular derivation was made to calculate the currents limited by space-charge between concentric spheres (either electron or ion but not in the presence of each other). For this invention, however, bi-polar charges exist within the spherical electrodes, and the Poisson's equation becomes:

(10) $$\frac{d^2V}{dr^2}+\frac{2}{r}\left(\frac{dV}{dr}\right)=4\pi(\rho_e-\rho_i)$$

where V is the potential at any radius $r$, and $\rho_e$ and $\rho_i$ are the electron and ion volumetric space-charge densities.

Equation 10, together with the energy equations $$\tfrac{1}{2}M_e v_e^2 = eV, \text{ and } \tfrac{1}{2}M_i v_i^2 = e(V_b - V)$$

where M is the mass of the charged particle, $e$ the charge of the electron, $v$ the velocity of the charged particle at any potential V, and $b$ is the point of ion entry (which in this invention is considered to be the anode since most of the charged particles are assumed to be formed at or very near to their respective electrodes); and the density, charge and velocity relationships $$J_e = \rho_e v_e, \text{ and } J_i = \rho_i v_i$$

(where J is the charge of the space-charge) are sufficient to determine all the relations involved in the electron and ion space-charge flows; i.e., all motions are assumed to be radial in this basic determination.

By following the general approach employed by Langmuir in a later paper, "The Interaction of Electron and Positive Ion Space Charges in Cathode Sheaths," ("Physical Review," vol. 33, page 954, June 1929), Equation 10 reduces to

(11) $$3\mu\frac{d^2\mu}{d\gamma^2}+\left(\frac{d\mu}{d\gamma}\right)^2+3\mu\left(\frac{d\mu}{d\gamma}\right)=1-\gamma\left[\frac{\mu^{4/3}}{\mu_b^{4/3}-\mu^{4/3}}\right]^{1/2}$$

where

(12) $$\lambda=\frac{I_i}{I_e}\sqrt{\frac{M_i}{M_e}}$$

$I_i$ = the circulatory ion current;
$I_e$ = the circulatory electron current in the presence of ions;
$\gamma = ln(r/r_0)$, ($r_0$ being the radius of the emitting surface); and $\mu = f(\gamma)$, (corresponding to the $\alpha$ of Langmuir and Blodgett and becomes $\alpha$ when $\lambda$ equals zero). In this ideal treatment $\mu_b$ is taken at the anode and is thus a constant.

A quantity similar to $\lambda$ was used by Langmuir in his June 1929 referenced paper which he called $\alpha$. He showed that the potential gradient at the surface of the anode was proportional to $(1-\alpha)^{\frac{1}{2}}$ and so became imaginary if $\alpha > 1$. In other words, if $\alpha$ were to become greater than unity, ions would be withdrawn faster than injected. While those calculations referred to a plane-parallel discharge, the same limitation has been found to apply to the spherical concentric shells if the area used in evaluating the current density J from the total current I is taken to be the area of a surface four-fifths of the distance from the emitter to the collector. (See I. Langmuir and K. T. Compton, "Review of Modern Physics," Vol. III, No. 2, April 1931) where one is confronted with radial flow, however, $\lambda$ may be larger than unity and still satisfy the boundary conditions.

Once $I_e$ is selected, then $\lambda$ and $I_i$ are uniquely determined; the ratio of the radii is likewise uniquely determined.

It will be noted, from Equation 12, that when one is concerned with a fixed ratio of the radii of the virtual electrodes, $\lambda$ has but one value and therefore becomes a constant. When $\lambda$ is zero (no ion current present), Langmuir and Blodgett's $\alpha$ may be substituted for $\mu$ in Equation 11 and reduces to:

(13) $$3\alpha\frac{d^2\alpha}{d\gamma^2}+\left(\frac{d\alpha}{d\gamma}\right)^2+3\alpha\left(\frac{d\alpha}{d\gamma}\right)=1$$

which, as should be, is the Langmuir and Blodgett equation.

Spangenberg (book "Vacuum Tubes," 1st ed. 1948, § 8.4, p. 181) submits that the equation for the electron space-charge flow of current for concentric spherical electrodes in the absence of ions is:

(14) $$I_0=\frac{29.34\times 10^{-6}\times V^{3/2}}{\alpha^2}$$

where V is the potential difference between the spherical electrodes and $\alpha$ is a function of $\lambda = ln\ (r/r_0)$ given by the Maclaurin series:

(14a) $\alpha = \gamma - 0.3\gamma^2 + 0.075\gamma^3 - 0.0013\gamma^4 + \ldots$

The values for $\alpha$ are valid whether the cathode is external or internal and can be found in tabular form in Table II of the referenced Langmuir and Blodgett paper. Two functions designated as $\alpha^2$ and $(-\alpha)^2$ are listed. The first applies to the case where the voltage V is evaluated at a point P outside the electron emitting electrode; the second where P is inside that source.

Germane to this invention, Langmuir's logic may be extended into the determination of electron and ion circulatory currents in the present of each other. As was the case for the Langmuir and Blodgett Equation 13, Equation 11 probably cannot be integrated directly, but a solution was obtained in the same manner as used by Langmuir and Blodgett. The electron circulatory current in the presence of ions took the form:

(15) $$I_e=\frac{29.34\times 10^{-6}\times V^{3/2}}{\mu^2}$$

The values for $\mu$ being obtained by expanding the Taylor's series:

(15a)
$$\mu=f(\gamma)=\gamma_0+\frac{\gamma+\gamma_0}{1}f'(\gamma_0)+$$
$$\frac{(\gamma-\gamma_0)^2}{2}f''(\gamma_0)+\frac{(\gamma+\gamma_0)^3}{3}f'''(\gamma_0)-\ldots$$

Equation 15a is expanded near zero to avoid infinite terms in the higher derivatives.

It is apparent from Equation 15 that the electron circulatory current $I_e$ is independent of the actual sizes of the spheres since the radii enter only as a ratio.

Knowing the value of $\lambda$ and the circulatory electron current from Equation 12, circulatory ion current $I_i$ can be determined. Thus:

$$(16) \quad I_i = I_e \times \lambda \times \sqrt{\frac{M_e}{M_i}} = \frac{29.34 \times 10^{-6} \times V^{3/2}}{(-\mu)^2 \sqrt{\frac{M_e}{M_i}}} \lambda$$

It was at this point in the solution of the Poisson equation for bi-polar charges in a spherical geometry that I was led to conclude, and which was later verified by experimentation, that a phenomenon of alternating virtual cathodes and anodes could be made to exist in the volume enclosed by the inner hollow electrode of a fusor. Furthermore, to satisfy the Poisson's equation, $\lambda$ would have to be greater than unity when a virtual cathode enclosed a virtual anode, such as shown by $r_{c_1}$ and $r_{a_1}$ (FIG 3). A "singularity" or mathematical discontinuity appears to exist at the virtual anode. Likewise, such a "singularity" appears to exist at the virtual cathode $r_{c_2}$, enclosed by the virtual anode $r_{a_1}$. In this type of system "a space-charge saturated current cannot be produced on the side of an emitting surface which radiates outwardly." The radial potential distribution for the fusor of this invention is shown in FIG. 5a. That such "singularities" do exist in the fusor of this invention can be likened to the case of a charge uniformly distributed over an imaginary spherical shell.

If one assumes that a positive charge Q is uniformly distributed over an imaginary spherical shell of radius $r_1$, Gauss' law for electrostatic charges may be applied to calculate the field intensity (E) and the potential (V) at any radius $r$ inside and outside of the radius $r_{a_1}$ (FIG. 5). Additionally, the surface charge density $\rho_s$ may be calculated as a function of the radial distance $r$. (See Sec. 1–20, Chapter 1, Part I, of "Electromagnetics" by John D. Kraus, McGraw-Hill Electrical and Electronics Engineering Series, 1st Ed., 1953.) It is found that the field intensity E is zero (in the absence of electric charges) for any radius inside the shell and the absolute potential at a radius outside the shell is given by $$(17) \quad V = \frac{Q}{4\pi r \xi_0}$$

where Q is the positive charge in coulombs; and $\xi_0$ is the permittivity of air in farads per meter. Since the field intensity is zero inside the shell, the potential within the shell will be constant. The surface density $\rho_s$ is zero everywhere except at the radius of the shell where it has the value $$(18) \quad \rho_s = \frac{Q}{4\pi r_1^2}$$

The variation of E, V and $\rho_s$ is shown by FIG. 6, curves (a), (b) and (c).

The similarity of the radial potential gradients of FIGS. 5a and 6b is marked. Inasmuch as the gradient $(dV/dr)$ at $r_1$ (FIG. 6) and $r_{a_1}$ (FIG. 5a) is zero, and a condition for space-charge saturation at $r_{a_1}$ is defined by an infinitely thin spherical shell at that radius, it is reasonable to assume that Equations 17 and 18 can be applied to the treatment of a radial potential distribution such as shown by FIG. 5a, even though that field is not produced by bound charges. It is helpful to identify the referenced emitting surfaces by subscripts (cathode c and numeral or anode a and numeral) which produced the circulating current (electron or ion) being calculated.

Since the circulatory currents through all virtual electrodes have constant values for all radii between the limits of travel thereof, it becomes fundamental that:

$$(19) \quad \frac{I_e}{I_o} = k^2$$

where $k^2$ is a constant independent of the voltages at any radii. Using Equations 14 and 15, Equation 19 may be written in the form:

$$(20) \quad k^2 = \frac{\dfrac{29.34 \times 10^{-6} \times V_a^{3/2}}{-\mu_c^2}}{\dfrac{29.34 \times 10^{-6} \times V_a^{3/2}}{-\alpha_c^2}} = \frac{-\alpha_c^2}{-\mu_c^2}$$

when the real cathode $c$ is the emitting surface.

Langmuir's Equation 12, et seq., in his paper of June, 1929, teaches a method for computing values of $I_e/I_o$ for plane-parallel electrodes for any values of his $\alpha$ (which corresponds to my $\lambda$ for the spherical-electrode geometry).

When the ratio of the radii $r_{a_1}/r_{c_1}$ (FIG. 3) approaches unity, the spherical geometry approaches the plane-parallel geometry so closely that the potential gradient at $r_{c_1}$ becomes zero and $I_e/I_o$ (and $k^2$) takes the same value as Langmuir's for $\alpha$ equal to unity, which is 1.8605. This means that the electron circulatory current in the presence of unlimited ions will be 1.8605 times that for the same applied potential in the absence of ions.

When $\lambda$ becomes zero, i.e., no ion current present, $I_e/I_o$ again is the same as Langmuir's $\alpha$ and $I_e/I_o$ (and $k^2$) which is unity.

Thus, one observes that with the limits for Langmuir's $\alpha$ and my $\lambda$ being identical, it holds that $\alpha$ and $\lambda$ will be the same for intermediate values. Accordingly, I have computed and plotted in FIG. 7 the values of $I_e/I_o$ for various values of $\lambda$ so as to permit obtaining any intermediate values readily.

Experimentally, one may apply a desired potential between the real anode 20 at radius $r_a$ and the real cathode 21 at radius $r_c$ (FIG. 3) and measure the current $I_o$ therebetween. Ions from the ion sources are then injected and measurements of the resulting currents $I_e$ recorded. The ratios of $I_e/I_o$ may then be calculated and the corresponding values for $\lambda$ obtained from FIG. 7.

Thus, having values for $I_e/I_o$ (or $k^2$), $I_e$ and $\lambda$, one may compute values for the corresponding $I_i$ $(-\alpha)^2$, and $(-\mu)^2$, keeping in mind that the virtual electrodes cannot emit outwardly and only the negative values for $\alpha$ and $\mu$ are valid. With these data, one has the means for obtaining the radial potential distribution.

The radius of the virtual anode $r_{a_1}$ (FIG. 5a) is generally known quite accurately from experimental data of a variety of kinds and largely by heuristic reasoning based on those data. The actual value of $r_{a_1}$ (and the resulting ratio $r_{c_1}/r_{a_1}$) depends upon the total energy losses, which will be taken up later, required to maintain the desired poissor and the magnitude of the high-energy ion current which flows through (or into) the real cathode 21 (radius $r_c$). The approximate values for $r_{a_1}$ have been determined visually for experimental fusors.

In the design of a working embodiment of a fusor, it is essential that the volume enclosed by the innermost virtual cathode, such as 30 at radius $r_{c_2}$ (FIG. 5a) be adequate to confine a sufficient total number of fusion particles (at a volumetric density of unity fusion probability) to assure the generation of a useful amount of power. It has been found that if the ratio of the radii of the adjacent pair of virtual electrodes is much greater than 3, the inner virtual cathode may not form; if the ratio of radii is too small, the circulatory currents required to maintain the poissor become excessively large.

In an actual working embodiment of a fusor, the radii of the virtual anodes and cathodes can be computed, as well as the values of the currents and the radial potential distribution outside of the virtual cathode 30 at radius $r_{c_2}$. The radial potential within the aforementioned virtual cathode has not been computed because as the radii of the balance of the virtual electrode system become much samller, errors in ion and electron optics begin to reveal themselves to the extent that it is not known whether or not the system continues to repeat itself. Since fusion does occur in the small volume in the fusor's center, the space-charge conditions prevailing therein have therefore been determined by logic and heuristic reasoning.

In FIG. 3 is illustrated diagrammatically one embodiment of this invention consisting of an anode 20, a cathode 21 and an ion gun 22. Enclosed within the cathode 21 is shown a poissor with a virtual cathode 29 at a radius of $r_{c_1}$, a virtual anode 31 at a radius of $r_{a_1}$, a virtual cathode 30 at a radius of $r_{c_2}$, and a vestigial virtual anode 32 at a radius of $r_o$. To understand the operation of the fusor, it is important to distinguish between the currents which flow through the apertures of the real cathode 21, referred to herein as "mesh currents" ($i_m$), and the current which flows into the real cathode 21, termed "cathode current" ($i_c$).

The ion "mesh current" ($i_{im}$) is produced by the ions:

(a) injected into the cathode 21 space from the ion guns;
(b) released by the anode 20 under bombardment by electrons and neutral gas molecules;
(c) created in the volume between the anode 20 and the cathode 21; and,
(d) created by the ionization process within the volume $r_{a_1}$ to $r_{c_1}$.

Those ions which originate on the anode 20 will be collected by the cathode 21, or returned to the anode 20 after but one round trip; those few ions created on the inward side of the virtual anode 31 ($r \leq r_{a_1}$) which have sufficient energy to penetrate therethrough will be collected by the anode 20 or the cathode 21 after only a few round trips; the other ions will oscillate from the virtual anode 31 through the cathode 21 apertures until collected by the cathode 21. The potential of the virtual anode 31 will build up to that of the anode 20.

The electron "mesh current" ($i_{em}$) which initially may be quite large and is extremely useful in the formation of the virtual electrode system, will become so small in operation as to be negligible. It is made up of those electrons emitted by the inner surface of the real cathode 21 and which flow through the cathode 21 apertures to the anode 20.

The total mesh current through the cathode 21 apertures, therefore, is the algebraic sum of the ion mesh current and the electron mesh current. Thus,

(21) $$i_m = i_{im} + i_{em}$$

The net cathode 21 current $i_c$ is the algebraic sum of the ion current into, and the electron currents into and out of it. Ions flowing into and electrons flowing out of the cathode 21 as usual are positive currents to the cathode 21. Thus,

(22) $$i_c = i_{ic} + i_{e2c} - i_{e1c} + i_{ec}'$$

where $i_{ic}$ is the ion current into the cathode; $i_{e1c}$ is the electron current into the inside of the cathode; $i_{e2c}$ is the electron current out of the inner surface of the cathode; and $i_{ec}'$ is the electron current from the outside surface of the cathode to the anode.

The space current $i_s$ into or out of the volume enclosed by the cathode 21 is the sum of the mesh current and the cathode 21 current, so

(23) $$i_s = i_m + i_c$$

The general condition for an equilibrium potential field occurs when $i_s$ becomes zero, as no charges are then being added or removed from the space. Accordingly,

(24) $$i_m = i_c = 0$$

and when $i_c$ is zero, the power consumed by the device is a minimum.

It is the ion mesh current $i_{im}$ into the central cathode 21 volume which maintains the density of the virtual anode 31, and which causes any free charges therein to be oscillated radially. As the inward flow of ions continues, the positive potential at the virtual anode 31 increases until all the inward flow of ions is cancelled by the outward flow to the cathode 21. The net ion mesh current then becomes zero. Neglecting the minute electron mesh current $i_{em}$, when all the electrons that are emitted from the inside of the cathode 21, as well as all of the ions and electrons generated within the cathode 21 volume, return to the cathode 21, it is apparent from Equation 22 that only the electron current, $i_{ec}'$, remains to flow to the anode 20. Thus, for $i_c$ to become zero, $i_{ec}'$ must likewise be brought to zero. Such an equilibrium potential field can be obtained when there are sufficient ions reaching the anode 20 to compensate for $i_{ec}'$.

Those ions from the virtual anode 31 which have energies equivalent to or greater than $V_a$ will reach the anode 20 and remove an equal or greater number of electrons therefrom. With a sufficient number of such ions reaching the anode 20, the component of cathode 20 current, $i_{ec}'$ can be reduced to zero.

In the disclosure thus far, a space-charge saturation of the cathode volume has been assumed. The ions which are created near the virtual anode 31 ($r \leq r_{a_1}$), where the ionization process is a maximum, have energies approaching $eV_{a_1}$. They traverse the inner virtual cathode 30 and the vestigial virtual anode 32 at fusion-reacting energies; this is an essential operating condition. The bulk of the ions which make up the ion mesh current $i_{im}$ are created in the volume outside the virtual anode 31 ($r \geq r_{a_1}$) and, like those ions from the ion guns 22 and the anode 20, are ultimately collected by the cathode 21; thus, if space-charge saturation could exist in this region, it would produce such an extremely large energy loss that nuclear-fusion reactions could not obtain. Fortunately, as previously shown, ion space-charge saturation cannot exist in this region, and operating conditions are maintained such that the ion circulatory current is just adequate to assure a virtual anode 31 of the desired size. Thus, the ideal radial potential distribution for the device of this invention (sometimes referred to herein as a "fusor") is as shown in FIG. 5a where the poissor is maintained by ion space-charge saturation in the volume $r \leq r_{a_1}$ and a non-space charge (dissymmetrical) field exists in the cathode 21 volume where $r$ is greater than $r_{a_1}$. $\lambda$, therefore, has the value which gives ion space-charge saturation only in the region adjacent to the radiating surface of the virtual anode 31 where the potential gradient is zero; electron space-charge saturation obtains in the region just inside of $r_{c_2}$.

Within a virtual anode 31 (FIG. 5a), each positive charge must be matched by an electron. Most of the flux lines from the ions at a radius $r \leq r_{a_1}$ terminate in the virtual cathode 30; where $r \geq r_{a_1}$, most of the flux lines terminate in the virtual cathode 29. All the charged particles in the cathode 21 volume are free to move and are in oscillation. The virtual anode 31 at $r_{a_1}$, the locus of maximum ion density, has the potential practically equivalent to $V_a$, and very few ions are formed inside that virtual anode with energies greater than $eV_{a_1}$. Thus, to maintain the potential $V_{a_1}$, it is only necessary that there be an equal number of flux lines from the inner of $r_{a_1}$ to $r_{c_2}$ as there are outward to $r_{c_1}$ (FIG. 5a). Ions with lesser energies than $eV_{a_1}$ will reach their reversal loci at radii greater than $r_{a_1}$ when $r \geq r_{a_1}$ or less than $r_{a_1}$ when $r \leq r_{a_1}$ and those ion densities will be less than at $r_{a_1}$. If a few ions are generated inside of $r_{a_1}$ with energies greater than $eV_{a_1}$, they will pass through the virtual anode 31 and fall to the cathode 21, and in some instances to the anode 20; they do not contribute to the ion circulatory current. The virtual anode 31 thus acts as an effective hi-pass ion filter for ions with energies greater than $eV_{a_1}$. Inside the virtual anode 31 where $r \leq r_{a_1}$, the ions travel slowly for a relatively large portion of their radial paths as they approach their respective reversal loci; the opposite is true outside the radius $r_{a_1}$ where the ions are decelerated rapidly as they approach $r_{a_1}$, giving up their energies within a very short distance from $r_{a_1}$.

The radial potential $V_r$ is a function of the radius $r$ and the time $t$; i.e., $V_r=f(r,t)$. The buildup of the poissor inside the radius $r_{a_1}$, together with the creation of the asymmetrical field outward from $r_{a_1}$, is shown diagrammatically by FIG. 8. The anode 20 and the cathode 21 initially are at ground potential as shown. If a negative potential of $V'_c$ (curve $a$, FIG. 8) of approximately −30 kv. is applied to cathode 21, and ions from the ion guns are injected into the cathode 21 volume concurrently, they begin to charge that volume positively. This charge will increase until the potential at some internal radius $r_{a_1}$ is sufficient to return the ions to the cathode 21 at the same rate at which they enter the cathodic 21 volume. This equilibrium may be expressed by the relation

(25)                                           $i_{im}=i_{ic}$

As soon as the potential inside the cathode 21 becomes positive, electrons emitted from the inner surface of cathode 21 will be accelerated toward and oscillate through the central volume and quickly establish virtual cathodes at $r_{c_1}$ and $r_{c_2}$. With the virtual cathodes formed, the position of the virtual anode between them is determined. The equilibrium radius and the potential of the virtual anode at $r_{a_1}$ requires a somewhat longer buildup time than the formation of the virtual cathodes at $r_{c_1}$ and $r_{c_2}$ because of the longer ion transit time.

When the negative potential on the cathode 21 is abruptly increased from $V_c'$ to $V'_c$ to $V'_c{''}$, similar sequences of events occur. Each of the subsequent equilibrium radial potential gradients is shown by curves $b$ and $c$ of FIG. 8.

To determine the position of the virtual electrodes, it is only necessary to establish the radial density distribution of electrons and ions. The radial potential distribution already has been so calculated. The virtual anode locus will lie close to the surface where the ion density is the greatest. The virtual cathodes will lie at the termini of the electron paths where the electron densities are the highest.

A practical embodiment of this invention by which the aforesaid conditions for a self-sustaining nuclear-fusion reaction can be produced is shown diagrammatically by FIG. 9. A spherical anode 20 of radius $r_a$ encloses dual concentric cathodes 21 and 36 of radii $r_c$ and $r_c'$, respectively, and ion guns 22 and 22a mounted on the outside of anode 20. The concentric cathodes 21 and 36, which are constructed of an electron-emitting material such as stainless steel, molybdenum or the like, and which have an openness of about 70% by virtue of spherically spaced, registered apertures 37 and 38, are supported within the anode 20 by suitable insulators (not shown). The concentricity of the cathodes 21 and 36 is maintained by suitable insulators therebetween (not shown). Attached to the outer cathode 36 on the axis passing through the ion gun 22 is a conical sleeve 40 through which the intense pencil-like ion beam is focused. Suitable connections are made between the unidirectional power supply 25 and the electrodes through leads 23, 24, and 42. The anode 20 is maintained at or near ground potential as shown, while negative potentials are applied to the cathodes 21 and 36 from a supply 43, with the outer being more negative than the inner.

In operation, most of the ions from the ion guns 22 and 22a are utilized to establish the initial virtual anode in the central volume of cathode 21 as previously described. Electrons from cathode 21 are prevented from reaching the anode 20 by the negatively biased outer cathode 36. The early removal of ions from the non-space-charge saturated field is greatly enhanced by the second cathode 36, and only those positive charges with energies greater than $V_a$ have any likelihood of avoiding capture on their first outward pass from the virtual anode 31 (FIG. 5a). Ions captured by the outer cathode 36 (FIG. 9), will create electrons therefrom which either will enter the cathodic space or be returned by the outermost virtual cathode.

VII. *Losses*

In order to form and sustain a radial-potential distribution such as is shown in FIG. 5a, it is first necessary to compensate for all losses. For a typical small fusor, these losses, which represent about 10% of the total power created, in their order of importance and magnitude are:

(1) Heat loss—7%
(2) Charge interchange—2%
(3) Power required to create electrons—⅔ of 1%
(4) Bremsstrahlung—⅓ of 1%

*Heat loss.*—In the center of an inner virtual cathode in a poissor, the ions from the inner side of the adjacent virtual anode are traversing the center from all directions. As they pass near other ions, they will experience some deflection which will result in small deviations from radial paths and thus they will appear to be in random motion. This is the equivalent of a very high apparent temperature, about $1.6 \times 10^9$ °K. for 100 kev. or about 11,600 °K./c.v. (Maxwell-Boltzman constant). This apparent temperature reduces to about $2 \times 10^6$ degrees K. in a distance of a few millimeters from the center. Any neutral atom which passes through this central region will be heated to an extremely high temperature. It will experience a cryogenic pumping action that will expel it to one of the real electrodes where, upon impact, it will give up its kinetic energy (heat), penetrate the surface to a depth determined by its kinetic energy, then diffuse out in a random direction following the cosine law. There is very little likelihood of its again reaching the center as it will remain in the vicinity of the electrode until ionization takes place.

It becomes very serious when too many high-energy neutral atoms are intercepted by the cathode as the cooling thereof is most difficult. On the other hand, cooling of the anode is relatively easy. The cooling of the cathode may be accomplished by conduction through its electrical connections to the power supply. The size of the cathode does affect the cooling problem, as increasing the size reduces the heating per unit area by the ratio of $1/r^2$ since the circulating currents are independent of the radii of the spheres.

Rutherford's scattering equation shows how the neutron count can be made to increase with an increase in applied voltage, for: the current rises by the three-halves power; and the particle density may be increased as it is proportional to four times the energy (or voltage) squared. Accordingly, the heat loss will decrease with an increase in voltage as there will be less scattering. For example, refer to FIG. 10, which shows a typical neutron cross-section curve for an equal mixture of deuterium and tritium. The operating points $a$ and $b$ are for the same fusion cross-section ($\sigma_f$), but from the point of view of the heat losses, $b$ provides for more efficient performance, for:

(26)                             $$\frac{N_{\frac{\theta}{2}}}{N_o}=\frac{\pi \rho_c^4}{4w^2}\cot\theta$$

where $$N_{\frac{\theta}{2}}$$

is the number of ions deflected by half angles; $N_o$ is the total number of ions; and W is the energy ($mv.^2=2W$); (($mv.^2)^2=4W^2$) which shows that the lower the voltage the greater the losses.

*Charge interchange.*—Ions travel relatively slowly within the radial thickness adjacent to the virtual anode due to the repelling forces of their like charges. Therefore, there is a fairly high probability that a charge interchange with a neutral atom may occur. This loss is discussed in my Patent No. 3,258,402, previously mentioned. This loss becomes sizeable if there are too many gas molecules present. The gas density (pressure) must be kept as low as is possible to maintain a high fusion probability. This affects the fusor's design characteristics. In practice, the fusor is operated at a neutral gas density of $3.535 \times 10^{13}$ molecules or less, such that $\rho_n$ is the normal gas density of $2.687 \times 10^{19}$ molecules/cc. at normal temperature (20° C.) and pressure (760 mm. of Hg); and $\rho_i$ the operating gas density, in ions per cc., is $$\frac{2.687 \times 10^{19}}{760 \times 10^{-3}} \times 10^{-6} = 3.535 \times 10^{13} \text{ ions/cc.}$$

at a working pressure of one micron ($10^{-3}$ mm. Hg).

As the power level of a fusor is increased, more ion current will be required from the ion guns, which in turn will increase the radius of the virtual anode 31 (FIG. 5a). This will mean a larger volume which, for ion space-charge saturation, will result in an increase of the total number of the ions contained therein. The greater power input (ions) will increase the power loss, thus again increasing the radius of the virtual anode until equilibrium is reached where the power input equals the power dissipated.

*Bremsstrahlung.*—When high-energy electrons are deflected on their passage through the virtual anode 31, they radiate at right angles to their directions of motion. As the electrons have momentum which must be conserved, there will occur an equal and opposite reaction when an electron changes its direction of travel. Since these reactions take place after the electron changes its direction, they are non-radial. These non-radial electrons broaden the virtual cathode 30 with a movement toward the center 26, and thus increase the electron temperatures. The so-called "radiation dampening" effect of the excess ions (positive nuclei) in the virtual anode tends to reduce the Bremsstrahlung losses to less than 1% of the power available in the virtual anode. With the value of the ion density in the virtual anode, the electron scattering can be computed by the well-known Rutherford formula for scattering.

VIII. *Fusion reactions*

The fusor, as shown diagrammatically in FIG. 9, is initially evacuated to a pressure of from $10^{-9}$ to $10^{-10}$ millimeters of mercury by means of a vacuum pump 44, the anode 20 being the hermetically sealed envelope. Potentials are applied to the various electrodes as already explained and a fusion-reactive fuel, in the form of gas, is introduced into the ion guns 22, 22a from sources 45 and 45a at a pressure of from $10^{-6}$ to $10^{-4}$ millimeters of mercury. This fuel gas is ionized by the guns 22, 22a and formed into ion beams directed diametrically toward center 26. A poissor forms, as previously explained.

High energy ions oscillate through the region of the center 26 along diametral paths, terminating adjacent to the virtual anode 31 (FIG. 5a). Other lower energy ions follow shorter diametral paths within the virtual anode 31 through the same region, thereby contributing to the density of ionic particles in the center. With the virtual anode 31 potential high enough (100 kv.), collisions of the high energy ions with others in the center 26 region will produce nuclear-fusion reactions.

There are a number of nuclear-fusion reactions which are possible. Fusion reactions of an exothermic nature will be specifically considered as one type of reaction which this invention seeks to attain. Power production by such reactions is theoretically proportional to both the amount of energy released per reaction and the number of reactions taking place per unit time. The number of reactions per unit time is obtained from the product of the nuclear cross-section, which expresses the probability for a specific nuclear reaction to occur, the number of ions in the center 26 region, and the number of projectile particles passing through this region from the anode 20 and the virtual anode 31 (FIG. 5a) per unit time. The nuclear cross-section, or the probability that a nuclear reaction will occur, is a function of the velocity or energy of the interacting particles, which in this device is a function of the potential difference between the anode 20, the virtual anode 31 and the center 26 (FIG. 3). From the above, it is clear that good power-producing reactions require a large nuclear cross-section and also a large amount of input energy.

One reaction which theoretically is outstanding in meeting the above requirement is the tritium reaction with deuterium. The nuclear equation for this process is:

(3) $_1D^2 + _1T^3 \rightarrow _2He^4$ (3.5 mev.) $+ _0n^1$ (14.1 mev.)

This states that a triton plus a deuteron plus the sum of their kinetic energies results in a nuclear reaction whose products are helium 4, a neutron, and the sum of the excess binding energy and the kinetic energy possessed by the original tritron and deuteron. The reaction energy released is 17.6 million electron volts (mev.) for the sample above. This value is large compared with the values for other possible reactions, which in most cases yield 3 or 4 mev. The nuclear cross-section for the reaction shown in Equation 3 peaks at a value of about $5 \times 10^{-24}$ cm.$^2$ for projectile energies of 100 kiloelectron volts (kev.). This cross-section value is about $10^2$ times larger than that for most competing reactions when compared at the same projectile energies.

Additional possible reactions are the following:

(1) $_1D^2 + _1D^2 \rightarrow _2He^3$ (.82 mev.) $+ _0n^1$ (2.45 mev.)

(2) $_1D^2 + _1D^2 \rightarrow _1T^3$ (1.01 mev.) $+ _1p^1$ (3.02 mev.)

(4) $_1D^2 + _2He^3 \rightarrow _2He^4$ (3.6 mev.) $+ _1p^1$ (14.7 mev.)

Reactions 1 and 2 have a lower value of released energy and a lower 100 kev. cross-section value than Reaction 3. Reaction 4 has about the same energy value but a lower 100 kev. cross-section value.

IX. *Fusion products in the discharge*

As already explained, when an external voltage is applied between the anode 20 and the cathode 21, 36 (FIG. 9), a system of virtual anodes and cathodes (poissor) is formed within the cathodic space. The radial potential distribution of the poissor was shown in FIG. 5a. It is within the minute volume enclosed by the virtual cathode 30, where the ion density is the greatest and the energies (velocities) of the projectile ions a maximum, that the probability of fusion is the highest.

It was shown by Equations 1, 2, 3 and 4 that, using only six deuterons, it is possible to trigger four different nuclear-fusion reactions, and these reactions result in the creation of five new kinds of particles having a total energy of 43.2 million electron volts (mev.). Four of these five particles ($_1p^1$, $_1T^3$, $_2He^3$ and $_2He^4$) are positively charged, and carry 26.65 mev.; the fifth is a neutral particle, the neutron, and the two produced by the two reactions carry 16.55 mev. There are two important aspects of this energy distribution between the charged and uncharged particles. Firstly, the neutrons will escape from the reacting system and dissipate their energy elsewhere as heat, because being uncharged, they easily pass through material walls. Only the charged particles will be retained within the reacting region and be available to compensate for energy losses (radiation, recombination, etc.) and to sustain the nuclear-fusion reactions. Secondly, it is only the energy of the charged particles, which represents 64% of the energy released by the four reactions, that is available to be converted directly into electrical power. It should be noted that only those ions which are created by the fusion reaction will have sufficient energy to produce electrical energy.

All of the particles formed by the nuclear-fusion reaction are ejected radially outward from the reaction volume with the high energies shown by Equations 1 through 4. These energies (velocities) are more than adequate to propel them through the virtual anode 31 (FIG. 5a). Under the influence of the real cathode 21, 36 (FIG. 9), they will be accelerated on their outward journey until passing through the cathode apertures 37, 38, where they will be decelerated by the anodic field and either brought to rest short of the anode 20 or impact the anode. If particles do not reach the anode 20, they will then reverse their direction of travel and go into oscillation through the center. Those which do strike the anode 20 will dissipate their remaining energies as heat and at the same time deposit their charges on the anode. A few particles may strike the cathode and be captured, with an accompanying release of secondary electrons.

With deuterium only in the fusor, for two D—D reactions (Equations 2 and 3) will take place at essentially equal rates. The positively charged products of these reactions which go into oscillation increase the ion circulatory current, thus increasing the ion density in the reaction space and hence the probability of fusion. The oscillating reactive particles ($_1T^3$ and $_2He^3$) may fuse with deuterons to produce the reactions shown by Equations 1 and 4, or may experience scattering, capture or recombination with electrons and become neutral atoms. The non-fusionable particles ($_1p^1$ and $_2He^4$) contribute to the fusion process only by the creation of fusion-reactive ions through the capture of electrons from fuel-gas atoms and by their contribution to the space-charge; ultimately, they will become neutral gas atoms. The neutral gas atoms will drift toward the electrode walls, where eventually they will be scavenged from the reaction system by the vacuum pump 44 (FIG. 9).

It has been stated that some of the charged particles will reach the real anode 20 when ejected by the nuclear-fusion reactions. When this occurs, the particles remove enough electrons from the anode 20 to neutralize their positive charges and form gas atoms. This is the equivalent of producing a current which flows from the anode 20 to the battery 25 (FIG. 9) (power supply). In other words, the charged particles have been coverted directly into electrical energy. This is one of the unique features of this invention.

Insertion of a suitable resistor 46 (FIG. 9) in series with the power lead 24 becomes a means for coupling the converted electrical power to an external load. A switch 47 is used to connect selectively this resistor 46 into the series arrangement.

It will be seen from Equations 1 through 4 that as many positive charges enter the fusion region as are removed therefrom. In other words, nuclear charges are conserved. What the fusion reactions do accomplish is the formation of new particles with the release of the excess binding energy of the original ions and, as the original energy must be conserved, the excess is applied to the new particles. Accordingly, the new particles leave the reaction volume at extremely high velocities. The replacement ions which enter the reaction volume do so at the comparatively low velocities of the order of 100 to 200 kev. Thus, there is an extremely short period when the potential in the center is less than prior to the fusion reaction which, in effect, tends momentarily to increase the negative potential of the virtual cathode 30 as well as decrease the virtual anode 31, and there is an associated increase in the electron current. This effect produces an increase in the radii of the virtual electrodes until the original potential of the vestigial anode 32 (FIG. 5a) can be restored. Thus, there is a periodic expanding and contracting of the poissor volume by the very high frequency oscillation of the inertially contained particles.

When the fusion reaction commences, there will be more positive charges leaving the center than flowing in and this condition will continue until steady state is reached. This would tend to develop what might be termed a "potential well" (more negative potential) at the virtual cathode 30. Such a condition could not exist, as current would then flow from the real cathode 21, 36 (FIG. 10) to the virtual cathode 30. Accordingly, the virtual cathode 30 must be returned to the real cathode potential within an extremely short period of time. This is accomplished by an equivalent increase in the potential of the virtual anode 31. The loss of positively charged particles from the center produces a positive bias on the virtual cathode 30 which is equivalent to an increase in the potential of the virtual anode 31. As these increases are cumulative until the steady state condition is produced, it is seen that the virtual anode 31 (FIG. 5a) reaches the potential of the real anode 20.

The positively charged particles formed by the fusion reaction perform work against the field of the virtual anode 31 as they pass through it. In so doing, their velocities are reduced somewhat, thus increasing the field and contributing to the potential of the virtual anode. They are then accelerated by the cathode, regaining energy.

It is the potential of the virtual cathode 30 (FIG. 3) which contributes to the energy of the positively charged particles which oscillate through the center 26. As the energies of the reacting particles increase, within the resonance limits of the nuclear-fusion cross-section, the probability of fusion increases. Electrons which are created within the virtual anode 31 are ejected radially outwardly with sufficient energy to overcome the repelling field of the real cathode.

If one were to lose control of the input density of the fuel-gas atoms, it might appear that the process of building up the potential of the virtual anode 31 could continue unabated and might well result in a catastrophic accident. Such is not the case, however, as there are "built-in" safety processes which act to prevent such a build-up. The principal control is the cross-section resonance phenomenon which occurs in nuclear reactions. The cross-section curves for D—D (total), D—T and D—HE³ reactions, such as contained in "Physical Review," vol. 88, p. 468, 1952, by Connor, Bonner and Smith, and also "Physical Review," vol. 88, p. 473, 1952, by the same authors, show that the D—T curve exhibits a maximum at an energy of 110 kilo-electron volts (kev.), where it falls off sharply with increasing deuteron energy. In the same energy range, the D—He³ cross-sections are appreciably less than the D—D (total) and the D—T values, but the curve is rising rapidly with increasing deuteron energy and it crosses the D—D (total) curve at 120 kev.; it approaches the D—T curve at 500 kev., its peak, and then falls off rapidly. For example, in the range of deuteron energies from 120 to 200 kev., the D—T cross-sections decrease 1 barn ($10^{-24}$ cm.²) while the D—D (total) and the D—He³ cross-sections increase only about 0.5 barn, an overall decrease of approximately 1 barn. After the D—He³ cross-sections pass their maximum at 500 kev., the decrease in the overall cross-sections is much more pronounced. Thus, it is apparent that the build-up in the potential of the virtual anode will be checked at deuteron energies greater than about 150 to 200 kev.

Another built-in safety process which assists in preventing a "run-away" by the so-called "potential well" is the widening of the negative potential sheath (virtual cathode 30) (FIG. 5a), as the radius is changed by the oscillating particles, which produces a decrease in the fusion cross-sections.

The conversion of the positively charged particles into electrical energy at the anode has been touched upon briefly. This phase will now be covered in some detail. In order to prevent the over-heating of the anode, it is highly desirable that most of the particle energy be given up to the decelerating virtual and real anode fields. The particles would reach the anode 20 with very much less than their original energies and thus dissipate less heat to it with a significant increase in the overall efficiency. The ideal situation would permit the charges to reach the anode 20 (FIG. 9) with little or no remaining energy, deposit their charges and drift away as neutral gas atoms. Obviously, with such a wide range of energies, 0.82 to 14.7 mev., this condition cannot be achieved. Therefore, one may envision two different operating situations; namely, (a) be satisfied with the maximum electrical conversion that can be obtained with the minimum heating of the anode 20, or, (b) operate the fusor as a heat machine to convert heat and charged particles into the maximum amount of electric power.

In the first situation, it becomes necessary to restrict, as nearly as possible, the fusion reactions to those of Equations 2 and 3, where the energies range from 0.8 to 3.02 mev., and to operate the anode at a potential which will produce a deceleration of the 0.8 mev. particles such that they arrive at the anode 20 with just sufficient energy to deposit their charges. The 3.02 mev. particles under this condition will impact the anode 20 and convert its remaining energy into heat. Inasmuch as approximately 50% of the D—D reactions will follow the proton branch, it is not possible to eliminate that higher energy particle. The reactions of Equations 1 and 4 may be reduced appreciably by operating the fusor at a lower than normal gas density, thereby removing the neutral helium-three and tritium atoms by the use of a large volume vacuum pump 44 before they have an opportunity to fuse.

In direct contrast, if the device is to be operated as a heat generator, the D—T and D—He³ reactions must be encouraged. Since the contribution of the D—T and D—He³ reactions could be quite significant in the direct conversion to electricity, it might prove advantageous in some applications to produce tritium by bombarding lithium-six with the neutrons:

(27)     $_3Li^6 + _0n^1 \rightarrow _2He^4 + _1T^3 + 4.6$ mev.

and then utilize the tritium as a fuel gas.

If enough positively charged particles can be made to reach the anode 20 to reverse the current flow from the battery 25, it then becomes possible to remove the applied anode (cathode) voltage 25 while continuing the nuclear-fusion reactions. If I and $V_a$ are the measured current and anode voltage before fusion, then after fusion commences the input power in watts will be

(28)     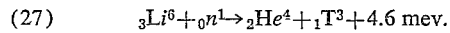

where $\langle F \rangle$ is the fusion expectancy; $e$ is the electric charge; A is the interception factor of the positively charged particles by the anode; and B is the interception factor of the positively charged particles by the cathode. Since the cathode 21, 36 is almost pervious to positively charged particles, A will be very much greater than B and when the value of $$\left[ -\langle F \rangle e(A-B) \right]$$

becomes greater than $I(V_a)$, the fusor will become truly self-sustaining. This condition will be reached without the aid of an external load. To remove electrical energy in excess of that required to drive the fusor, it only becomes necessary to add an external load 46 such as shown in FIG. 9.

*Working embodiment*

A working embodiment of this invention as shown in FIG. 9 is illustrated in substantial detail in FIGS. 11 through 22. In these figures, like numerals indicate like parts. The anode 20 is of spherical construction, being fabricated of two hemispherical shells of stainless steel hermetically sealed together at the equators by means of suitable annular sealing flanges 47a. Concentrically positioned inside the anode 20 are the two cathode shells 36 and 21, respectively, which are also assembled of hemispherical shells of stainless steel. The means for supporting these electrodes concentrically will be described in detail hereinafter.

Eight ion guns 22, 22a are mounted on the exterior of the anode 20 in spherically spaced and diametrically aligned relationship, these guns all having beam axes which intersect at the center 26 of the fusor. The precise location of these ion guns 22, 22a is explained in connection with the spherical diagrams of FIGS. 18a and 18b which show the angular relationship therebetween. Each of the ion guns is indicated by a circle with a center dot indicating the spot at which the gun axis intersects a spherical surface defined by the anode 20. FIG. 18a illustrates a spherical surface corresponding to the anode and cathode shells with the plane of the drawing being the same as the cross-sectional plane of FIG. 11. This latter plane includes the north and south poles of the sphere. The line 47b indicates the equatorial plane at right angles to the plane of the drawing. In FIG. 11, this equatorial plane would pass midway between the annular flanges 47a. The guns 22 and 22a are located in the planes spaced 45° from the equatorial plane 47b as shown, these planes passing through the tube center 26 and being rotated about the equatorial diameter which is perpendicular to the plane of the drawing. As shown in FIG. 18b, which is a right angle projection of the spherical surface of FIG. 18a, there are four such guns 22 spaced 90° apart on the spherical surface and on the same meridian. In terms of angular displacement, these guns are indicated as lying on the 0°, 90°, 180° and 270° lines. Within each plane containing guns, each gun center is at the intersection of a radius 45° above the equator and the spherical surface, certain of the radii lying in the plane of FIG. 18a.

Four ion guns 22 are so located in the upper or northern hemisphere of the sphere while four other guns 22a are located allochirally in the southern hemisphere.

The apertures 37 and 38 in the cathode shells 21 and 36, respectively, are in twelve registered pairs, each pair 37 and 38 being diagrammatically indicated by an X mark which is assigned numeral 48 in FIGS. 18a and 18b. The locations of the ion guns and the apertures 48 are indicated as being on the same spherical surface for showing the angular relation therebetween. There are four screen aperture pairs 48 on the equator as shown in FIG. 18b at the 0°, 90°, 180° and 270° lines. Planes intersecting the north and south poles which are spaced from each other by 90° contain the remaining aperture pairs 48, these planes being spaced 45° from the 0°–180° plane which includes the north and south poles also. In these individual 90° planes, on a radius at an angle of 35°16' with respect to the equatorial plane 47b, lie the remaining aperture pairs 48. The spherical surface containing the aperture pairs 48 may be regarded as that of one of the cathode shells 21 and 36.

With the equators of the cathode and anode shells lying in the same equatorial plane, the aperture pairs 48 are thus spherically offset in a regular angular pattern from the ion guns 22 and 22a.

The anode 20 shell, as well as the cathode shells 21 and 36, are supported in position by a tubular mounting assembly indicated generally by the numeral 49. This mounting assembly includes a stainless steel pipe section 50 perimetrically welded at one end to an opening 51 in the anode shell 20. Coaxially and hermetically secured to the opposite end of the tube 50 is a larger diameter supporting tube or pipe section 52. Inside this larger tube 52 is a smaller diameter sleeve 53 having a sliding fit therewith, the upper end portion of sleeve 53 being secured to the radial flange 54 which joins the two pipe sections 50 and 52.

At the bottom end of the sleeve 53 is coaxially secured a mounting ring 55 from which depends four metal posts 56 spaced 90° apart around the axis of the pipe section 52. A metal disc 57 is coaxially secured to the bottom ends of the posts 56 by means of suitable screws 58, this disc 57 having secured to the central portion thereof a ceramic post 58a. This post 58a is coaxially positioned inside the pipe section 52 as well as the smaller pipe section 50 by means of the mounting sleeve, rings and posts just described.

Secured to the upper end of the post 58a and coaxially extending thereabove is a metal post 59 having threadedly connected thereto a disc-like mounting stud 60 which is welded into an opening 61 in the outer cathode shell 36. Abutting against the flat surface of this stud 60 is a ceramic or the like spacer 62 having a boss 63 intimately fitting into a locating aperture 64 in the inner cathode shell 21. The spacer 62 is sandwiched between the two shells 21 and 36, thereby determining the spacing therebetween.

The post 59 is of such length with respect to the pipe section 50, for example, as to position the two cathode shells 21 and 36 concentrically inside the anode shell 20. This post 59 may be regarded as coinciding with the south poles of the cathode and anode shells.

At the north poles of these shells is located further supporting structure as well as a terminal assembly for connecting the operating voltages to the electrodes. This assembly includes an annular spacer 65 of suitable insulating material, such as boron nitride, positioned between the two shells 21 and 36 so as to determine the spacing therebetween. This spacing is the same as that between the south poles. Coaxially secured inside this spacer 65 is a conductive terminal button 66 which is intimately conductively fitted into a companion aperture in the shell 21. This aperture coincides with the north pole of the shell.

Telescoped over an upwardly projecting portion 67 of the spacer 65 is an elongated tubular element or conductor 68 which intimately fits into and makes conductive contact with an aperture 69 in the outer shell 36. This conductor 68 passes diametrically outwardly through the relatively large insulating aperture 70 in the anode 20 in spaced relation therewith, this spacing being large enough to provide insulation at the high voltage at which the fusor is operated. A conductive tubular assembly 71 is rigidly and hermetically sealed to the exterior of the anode 20 in registry with the aperture 70 and extends coaxially outwardly with respect to the conductor 68. At the upper end of this assembly 71 is secured a relatively long, cylindrically shaped insulator 72 (FIG. 12) which has secured to the upper end thereof a conductive terminal assembly 73. This terminal assembly 73 is provided with a suitable connection terminal 74 by means of which cathode bias from the battery 43 may be connected to a wire 75 which extends coaxially through the conductor 68 and connects to the terminal button 66. This tubular assembly 71, 72 and 73 which coaxially surrounds the conductor 68 is hermetically sealed such that the space between the conductor 68 and the assembly 71, 72 and 73 may be evacuated and held at the same pressure as the interior of the anode 20.

Inasmuch as high operating potentials prevail between the conductor 68 and the outer tubular assembly 71, 72 and 73, suitable corona shields 76, 77 and 78, of annular configuration, are used for the purpose of preventing corona discharge. Other configurations for the terminal and supporting assembly may be used without departing from the spirit and scope of this invention, the requirement for such an assembly being that it provide the necessary physical support for the fusor anode and cathode elements and also be capable of supplying the anode and cathode elements with the operating voltages without producing corona discharges or field emission.

All of the ion guns 22 and 22a are identically constructed such that a description of one will suffice for all. For this purpose, reference is made to FIGS. 11, 13, 19, 20 and 21. Each ion gun includes a conductive housing or sleeve 79 of stainless steel or the like which is perimetrically sealed to an opening 80 in the anode shell 20. The sleeve 79 is positioned such that its axis coincides with a diameter of the anode 20. Coaxially secured internally to the sleeve 79 and against the anode 20 is an aperture plate 81 having a beam-defining aperture 82. Coaxially positioned inside the sleeve 79 in radially spaced and insulated relation therewith is an anode sleeve 83 having a frusto-conically shaped bore 84, the smaller diameter end of this bore being positioned as shown. Three arcuately shaped and circumferentially spaced insulators 85 surround the anode 83 in spaced relation therewith. For securing these insulators 85 to the anode 83, a thin metal ribbon 86 fits into a shallow circumferentially groove and binds the three insulators 85 against the anode 83.

Axial positional support for the anode 83 is provided by means of three ceramic, axially extending posts 87 which are fastened to the outer surface of the anode 83 at points spaced circumferentially equally part. One such post 87 is shown in FIG. 13. Considering this latter figure along with FIGS. 20 and 21, these three posts 87 are secured to a metallic mounting ring 88 which in turn is secured at its outer periphery to a cap assembly indicated by the numeral 89. This cap assembly 89 is composed of suitably machined metal parts formed to a substantially cylindrical shape of somewhat larger diameter than the sleeve 79, this cap assembly 89 being hermetically sealed to the sleeve 79.

As shown more clearly in FIGS. 19 and 21, three power supply terminals 90, 91 and 92 are mounted in the cap assembly 89 and are spaced circumferentially apart 120°. The terminal 90 has a wire conductor 93 internally thereof which passes coaxially through one of the supporting posts 87 and connects to the anode 83. The terminals 91 and 92 have suitably strong, bar-like conductors 94 and 95 which project into the central portion of the gun and pass through a block 96 of insulation for maintaining the spacing therebetween. At the innermost ends of these conductors 94 and 95 is connected a thermionic filament 97, this filament being in the form of a circular loop of wire located coaxially with respect to the axis of the ion gun. As shown in FIG. 11, this filament 97 is situated to the rear of the anode 83.

A pipe fitting 98 is also secured to the cap assembly 89 midway between the two filament terminals 91 and 92 and communicates with the inside of the ion gun as shown. By means of this pipe connection 98, fusion-reactive gas may be admitted to the interior of the ion guns from a suitable source 45 (FIG. 9) by the adjustment of series-connected hand valves 99.

The anode 83 is maintained insulated from the surrounding sleeve 79 such that a power supply 100 may be connected between this anode 83 and the sleeve 79 as well as the anode 20. In FIGS. 11 and 13, such a power supply 100 is indicated as being connected with the positive electrode to the terminal 90 and the negative electrode to ground and the housing 79 of the ion gun. This power supply 100 in an operating embodiment of this invention is designed to supply a voltage which is variable between the limits of 0 and 1,000. A suitable voltage connected between the two terminals 91 and 92 (FIG. 21) serves to energize the filament 97.

Each ion gun 22 in operation generates and emits a beam of ions which is directed toward the fusor center 26. In order to approach this center 26, the beam must penetrate the cathode structure 36, 21, and for this purpose a suitable aperture assembly is provided therein. This assembly is indicated in enlarged detail in FIGS. 16 and 17 and is shown in proper coaxial relationship with respect to the ion guns in FIG. 11. Each aperture assembly includes an annular insert 101 having smoothly radiused corners, which tightly conductively fits into a companion aperture 102 in the shell 36. The shell 21 is provided with an aperture 103 of the same diameter as aperture 102 in precise radial registry therewith.

The beam emitted from the respective ion gun 22 passes through the annulus 101 and the aperture 103. Each aperture 38 in the cathode shell 36 is covered with a biasing screen indicated by the numeral 104 (FIGS. 14 and 15), this biasing screen 104 being secured in position by means of a first mounting ring 107 secured to the outside of the shell 36 in registry with the opening 38 and another ring 106 which clamps the screen 104 to the ring 105. The aperture 37 in the shell 21 is of a size equal to that of the aperture 38. The two rings 105 and 106 are firmly, conductively secured to the shell 36 by means of a series of circumferentially spaced screws 107.

Except where otherwise stated, the structure of FIG. 11 is fabricated of metal and primarily of stainless steel. The cathode shell 21 should be of a material which is photoelectric, and two suitable materials having the necessary properties are stainless steel and molybdenum. Other material obviously may be used without departing from the spirit and scope of this invention.

Inasmuch as the dimensions of the structure of FIG. 11 are relatively small in comparison with the operating voltages which are used, it is of course necessary to take the usual precautions in connection with preventing field emission and corona discharge. Suitable corona shields in various places are used as explained in some detail hereinabove, and all sharp edges, corners, points and the like, from which field emission could occur, are avoided.

The ion guns 22 and 22a are disposed in pairs which are diametrically opposite each other. Additionally, the axes of these opposite pairs are set to be coincident such that the ion beams emitted thereby will occupy essentially the same pencil-like space. This space passes through the fusor center 26.

The operation of the device of FIG. 11 is essentially as has already been described hereinbefore in connection with FIG. 9. To start with, all operating voltages are turned "Off" and a suitable vacuum pump 44 is connected to the interior of the anode shell 20. Referring to FIG. 11, such a vacuum pump is connected to an outlet port 108 in the cap 109 which seals the end of pipe section 52. Thus, gas inside the anode 20 as well as the cathode shells 21 and 36 may be evacuated therefrom, through the pipe sections 50 and 52, through webs in the disc 57 and out of the port 108.

The pump 44 is allowed to operate for a sufficient period of time and the fusor is otherwise outgassed so as to remove contaminates which could interfere with operation.

After outgassing and evacuating the fusor to a pressure of from $10^{-9}$ to $10^{-10}$ millimeters of mercury, a suitable fusion-reactive gas, such as deuterium, from gas sources 45 and 45a (FIGS. 9 and 11), is admitted to the ion guns 22 and 22a by adjustment of the valves 99. For this purpose, these valves 99 are opened just sufficiently to admit small quantities of gas which will raise the pressure to from $10^{-6}$ to $10^{-4}$ millimeters of mercury. However, just prior to admitting this gas to the ion guns, operating voltages are applied to the fusor as previously explained. In this connection, in order to have complete control of the fusor operation, it is desirable that all voltages be applied progressively starting from zero voltage. Initially, the voltage is applied to the terminals 91 and 92 for heating the filaments 97 of all of the ion guns 22 and 22a. Next, the voltages of ion gun power supplies 100 are increased progressively starting with zero voltage until a sufficiently high difference of potential is applied between the anodes 83 and the respective filaments 97 so as to ionize the fusion reactive gas that has been admitted and to form ion beams. Next, the power supply 25 is steadily increased in voltage until fusion reactions are noted. The detection of neutron counts by usual methods can serve as such an indication. The power supplies 100 are adjusted until a satisfactory degree of ionization as well as suitable intense and compact ion beams are obtained which are directed toward the fusor center 26. Instrumental in the formation and acceleration of these ion beams is, of course, the potential applied to the anode 20 and the cathode 21, 36.

The vacuum pump 44 connected to the port 108 may be kept operating continuously so as to maintain the neutral gas pressure within the fusor to suitably low levels, and, additionally, the gas valves 99 may be opened slightly or may be opened and closed intermittently for the purpose of supplying necessary quantities of fuel gas to the fusor in order to obtain the reactions desired. By adjusting the high voltage supply 25, the reaction rate can be changed. Similarly, adjustment of the ion gun anode voltage can affect the reaction rate. Increasing and reducing, selectively, the quantity of neutral gas admitted to the fusor also affects the reaction rate. Therefore, desired reaction rates may be controlled by adjustment of the various circuit and system parameters. A gas pressure of about $10^{-5}$ mm. Hg continuously maintained has been found suitable for producing fusion reactions.

As shown in FIG. 12, the switch 47 which is connected in series with the high voltage supply 25 is closed, and the neutron-producing reactions just described are obtained. If it is desired to obtain an electrical output from the fusor, it is only necessary to open the switch 47 to place the resistor 46 in series with the high voltage supply. As the reaction rate increases within the fusor and reaches a suitably high value, a reverse current is developed in the circuit of the anode 20 in the direction of the arrow Z adjacent to the resistor 46. This results in the development of a voltaged drop across the resistor 46. This reverse current Z will develop when the voltage generated on the anode 20 exceeds that of the supply 25. Once this self-sustaining operation is achieved by the generation of this anode voltage, the high voltage supply 25 may be taken out of the circuit by first disconnecting the battery and then providing a conductive or essentially short circuit in place of the supply 25. However, such a circuit change is not necessary if the supply 25 is adapted to conduct current in the reverse direction.

In order to form the poissor in the center of the cathode 21, 36, it is, as previously explained, necessary to have both ions and electrons. These ions are supplied primarily by the ion guns 22 and 22a. The electrons are in part provided by photoemission from the internal surface of the cathode shell 21. The ions from the ion guns 22 and 22a establish the initial virtual anode as previously explained in the central volume of the cathode shell 21. The poissor thereupon forms, as previously explained. Electron flow from the inside of the cathode shell 21 to the anode 20 is inhibited by reason of the fact that the cathode shell 36 is biased negatively with respect to the shell 21. This bias is supplied by the power supply 43 and is adjusted to a value at which the external anode 20 current is reduced to a desired minimum. The screens 104 over the openings 38 in the outer cathode shell 36 provide the desired equal potential surface which is more negative than the potential on the cathode shell 21. This inhibits the escape of electrons from the inside of the shell 21, thereby reducing losses due to the interception of such electrons by the anode 20. Also, the screens 104 prevent the positive field from the anode 20 from entering the apertures 37 of the cathode shell 21 and upsetting the spherical configuration of the equal potential surface therein, as previously explained.

The various aperture pairs 37 and 38 are arranged in diametric opposition for radial ion traversal. A cathode shell 21 and 36 construction of about 70% openness provides adequate ion permeability.

*Alternative working embodiment*

In FIGS. 22 through 26 is illustrated an alternative working embodiment wherein like numerals indicate like parts. Basically, the difference between this embodiment and the one just described and shown in FIG. 11 resides in the use of a single cathode shell assembly 21 instead of the double-shell arrangement 21 and 36 of FIG. 11. The construction of the fusor of FIG. 23 to the extent that it differs from the arrangement of FIG. 11 will be described in detail in the following.

The cathode shell 21 of FIG. 23 is mounted in concentric relation with respect to the anode 20 by means of the pedestal assembly 49a which corresponds to the assembly 49 of the fusor of FIG. 11. This assembly 49a includes a stainless steel or the like supporting tube 50a secured at one end to the anode 20 as shown. An apertured disc 110 is perimetrically fastened inside the tube 50a in the position shown and has secured thereto a ceramic post 111 which projects coaxially through the tube 50a to a position just inside the anode 20. The opposite end of the ceramic post 111 is secured to a mounting plate 112 suitably rigidly secured to the cathode shell 21. All the parts just described are sufficiently strong and rigid to position securely the cathode 21 with respect to the anode 20.

The left-hand end of the tube 50a of FIG. 23 is adapted to have a vacuum pump connected thereto the same as has already been described in connection with the preceding embodiments.

The high voltage terminal assembly 72a corresponds to the assembly 72 of FIG. 11. This assembly 72a comprises a conductive tubular assembly 71a capped at its right-hand end as shown in FIG. 23 with a bottle-like insulator 113 which is sealed in vacuum-tight relation to the tubular assembly 71a. Extending coaxially through the assembly 71a and the insulator 113 is a rod-like electrode 114 which corresponds to the tubular element 68 of FIGS. 11 and 12. The inner end 68a of this electrode 114 has rigid conductors 115 connected to a mounting plate 116 secured to the cathode 21 as shown. The opposite end 117 of the electrode 114 penetrates in vacuum-sealed relation the re-entrant end wall portion 118 of the insulator 113 to have connected thereto the high voltage leads shown diagrammatically in FIG. 23. The parts 71a, 113, 114, 115 and 116 are sufficiently strong and rigid as to assist in centering and securing the cathode 21 within the anode 20. A suitable bellows structure 119 is incorporated within the assembly 71a along with a threaded micrometer adjustment 120 for tilting the assembly 71a, 113 slightly so as to position adjustably the cathode 21 within the anode 20. The total support for the cathode is provided by the two assemblies 49a and 71a.

The cathode 21 itself may be made identical to the cathode 21 of FIG. 11, apertures 37 and 103 being provided therein. The biasing function of the outer shell 36 of FIG. 11, however, is performed by a biasing screen assembly shown in enlarged detail in FIG. 24 and identified generally by numeral 121. This assembly includes an annular spacer 122 of stainless steel or the like which has secured to the underside thereof a fine mesh, conductive screen 123 which fully covers the aperture 37. Concentrically positioned on the peripheral portion of the screen 123 is an annular insulator 124 L-shaped in cross-section as shown. Seated on the insulator 124 is another spacer 125 of some suitable conductor such as stainless steel which has secured to the upper side thereof a second screen 126 like the other screen 123. The screen 126 is arranged parallel to but is spaced from the screen 123 for performing the purposes previously explained in connection with the screens of FIGS. 14 and 15 which are attached to the outer cathode shell 36.

Fitted over the spacer 125 is another annular insulator 127 of L-shaped cross-section which engages the main spacer 122 for holding the second spacer 125 in concentric position.

Superposed on and in engagement with the spacer 122 and the insulator 127 is a flat annular retaining ring 128 which clamps the parts 124, 125 and 127 into assembly. An annular cap 129 fits over the retaining ring 128 as shown, and a plurality of circumferentially spaced screws 130 passing through the parts 129, 128, 122 clamp the latter together and secure the same to the cathode 21.

A sleeve 131 of insulating material is radially secured within a companion aperture in the main spacer 122 as shown and receives therethrough a conductive connecting wire or lead 132. This lead at its inner end is conductively connected to the spacer 125 by being clamped between the spacer 125 and the insulator 124 as shown. Each of the apertures 37 in the cathode 21 is provided with a biasing screen assembly 121 as just described and the leads 132 of all of these assemblies are connected together so that the biasing potentials applied to all of the screens 126 will be the same.

As in the fusor of FIG. 11, each of the cathode apertures 103 of the fusor of FIG. 23 is coaxially aligned with the beam axis of the respective ion guns 22 and 22a. However, in each of the apertures 103 of the fusor of FIG. 23 is provided a biasing-electrode assembly shown in enlarged detail in FIG. 25. This assembly includes a tubular sleeve 133 of ceramic having an enlarged annular projection 134 thereon. The sleeve 133 intimately fits into the cathode opening 103 with the projection 134 seating against the outer cathode surface. A tubular metal insert or electrode 135 is snugly received by the sleeve 133 as shown and is provided with an end portion 136 which engages the bottom end of the sleeve 133 as shown. The upper end of the insert 135 is flared outwardly into a smoothly radiused flange 137 which overlaps the upper end of the sleeve 133. A suitable wire-like conductor 138 is wrapped around the insert 135 between the flange 137 and the upper end of the sleeve 133. This wire 138 is of such diameter as to have a wedging fit between the flange 137 and the sleeve 133 thereby locking the electrode 135 to the sleeve 133. The assembly described thus far is finally secured to the cathode shell 21 by means of a clamping ring 139 fitted over the projection 134 and welded to the shell 21.

Either as a part of the wire 138 or otherwise secured thereto is a connecting lead 140 for applying a biasing potential to the electrode 135. As will now be apparent, this electrode 135 is insulated from the cathode 21.

All of the ion-aperture assemblies as shown in FIG. 25 are interconnected by leads 140. All of these leads 140 are interconnected with the leads 132 of the biasing screen assemblies 121 so that the electrodes 135 will have the same biasing potential applied thereto as the various screen 126.

Biasing potential is connected to the biasing electrodes 135 (FIGS. 24 and 25) by means of the assembly shown in FIG. 26. This assembly includes an evacuated tubular housing, indicated generally by the numeral 141, composed of tubular housing 142 of metal hermetically sealed at the inner end to anode 20 and at the outer end to a glass insulator 143 also of tubular configuration. Coaxially within the tubular housing 141 is a center conductor assembly composed of a metal tube 144 which is hermetically sealed at its outer end with a metallic plug 145. A tubular conductor 146 is also sealed at one end to the plug 145 and receives on the other end a sleeve-like terminal 147 hermetically sealed at 148 to the conductor 146 and at the end 149 to the outer end of the insulator 143. The space between the outer wall 142, 143 and the conductor assembly 144, 145, 146 is vacuum-tight and in communication with the fusor interior. A metal cap 150 conductively carrying a sleeve-like contactor 151 telescopes over and conductively engages the terminal 147. The cap 150 is molded into a protective rubber cover 152 which carries a conductive pin 153 connected at one end to the cap 150 and projects outwardly to a point at which a connection may be made to an external biasing circuit. This biasing circuit is indicated as being in the form of a battery 154 having its positive terminal connected to the cathode shell 21 and the negative terminal to the pin 153.

A loop of spring wire indicated by the numeral 155 conductively engages the peripheral portions of one of the screens 126 and is formed by convoluting one end portion of a wire 156 which extends through the conductive tube 144. This wire 156 is of such length that the upper end thereof engages the conductive plug 145 and makes conductive contact therewith. The wire 156 is maintained in position within the tube 144 by means of a small metal ring 157 fitted into the end of the tube 144. It will now be seen that by providing one of these assemblies 141 on the fusor of FIG. 23, biasing potential may be applied to all of the screens 126 and ion-aperture electrodes 135.

Referring to the ion guns 22 and 22a of the fusor of FIG. 23, it should be noted that annular magnets 158 are provided thereon which encircle the sleeve elements 79. These magnets 158 have one pole adjacent to the anode 20 and the other pole outwardly therefrom. They are positioned with respect to the anode 83 (FIG. 13) such as to lengthen the travel of the electrons emitted by the cathode 97 axially of the gun thereby increasing the probability of ionization by each electron. This provides an increase in ion generation over the electrostatic arrangement shown in FIG. 13. In all other respects, the ion guns 22 and 22a of FIG. 23 are like that shown and described in connection with FIG. 13.

The operation of a fusor of FIG. 23 is the same as that of the fusor of FIG. 11 in almost all respects. The same techniques and operating voltages are applied, and all of the voltages are made variable so as to provide convenient control of fusor operation. As in the case of the fusor of FIG. 11, the bias on the screens 126 and the electrodes 135 and supplied by the battery 154, for example, is adjusted to a value at which the external anode circuit current is reduced to a desired minimum. The screens 126 over the openings 37 in the cathode shell 21 provide the desired equipotential surface which is more negative than the potential on the cathode shell 21 as well as the inner screens 123. This inhibits the escape of electrons from the inside of the shell 21 thereby reducing losses due to the interception of such electrons by the anode 20. Also, the screens 126 prevent the positive field from the anode 20 from entering the apertures 37 and disturbing the spherical configuration of the poissor therein, as explained previously.

The electrodes 135 form the same biasing function, these being more negative than the cathode shell 21, thereby setting up equipotential surfaces which inhibit the outward flow of electrons from the interior of the cathode shell 21.

Alternative ion gun

In FIGS. 27 through 29 is illustrated an alternative ion gun 22b which may be substituted for the guns 22 and 22a of the preceding embodiments. Comparing this gun 22b with the one of FIG. 13, like numerals will indicate like parts. Instead of providing a cap such as 89 in FIG. 13 for sealing off the end of the gun, a ring flange 89a, like the flange 87, is used for mounting one end of a tubular anode extension, indicated by the numeral 159. The outer end of this extension 159 is hermetically sealed by means of a cap structure 160. Thus, it will be noted that the body or envelope of the gun 22b which includes the parts 79 and 159 is considerably longer than the bodies of the guns 22 and 22a.

Carried by the wire conductor 93 of the terminal 90 is a tubular electrode 161 which corresponds to some extent to a control grid in an ordinary vacuum tube. This sleeve 161 is secured to the conductor 93 and additionally has a conductive connection 162 to one of the filament leads 94. The filament 97 as well as the electrode 161 are biased negatively by means of a battery 163, the negative terminal being connected to the conductor 93 and the positive terminal to the body of the gun 22b. This body 79, 159 constitutes a conductive extension of the anode 20 such that it is operated at the same potential as the anode 20. Surrounding the anode extension 159 is a series of bar magnets 164 arranged with the longitudinal axis thereof parallel to the axis 165 of the gun 22b. Supporting these bar magnets 164 are two axially spaced mounting rings 166 and 167, these rings being made of iron or some equally suitable, highly magnetic material. A band 167a clamps these magnets onto rings 166 and 167 and retains them in assembly. There are six such magnets used in the arrangement of FIG. 27 as shown more clearly in FIG. 28; however, either a greater or fewer number may be used without departing from the scope of this invention.

In operating the guns 22b, the same conditions of fusor operation as explained previously are observed. More specifically, with respect to the gun 22b, a suitable filament voltage is applied to the filament 97 for the generation of ionizing electrons. Since the filament 97 is substantially contained within the length of the electrode 161, the electrons in order to travel to the anode 159 must move axially of the gun. By reason of the focusing influence of the magnets 164, the electrons will be directed rightwardly as viewed in FIG. 27 in a spiral path until they are eventually collected by the right-hand end portion of the anode 159. Fusion-reactive gas admitted to the gun via the fitting 98 will be ionized by these electrons, such ions thereupon coming under the influence of the more negative electrode 161 as well as the fusor cathode 21. The ions eventually are accelerated through the aperture 82 and form into beams which travel paths intersecting the tube center 26.

Higher ion currents may be obtained from the ion guns 22b than those of FIG. 11 inasmuch as the ionizing electrons emitted from the filament 97 (FIG. 27) are accelerated through longer paths before interception by the anode; hence, they have a greater probability of producing ions before being intercepted.

In the following are given dimensions and values for system and circuit parameters for the embodiment of this invention as shown in FIG. 23, these being given by way of illustration only and not by way of limitation.

Dimensions

| | | |
|---|---|---|
| Internal diameter of anode shell 20 | inches | 6 |
| Thickness of anode shell 20 | do | 0.093 |
| Anode 20 material | | [1] 304 |
| Internal diameter of cathode shell 21 | inches | 4.38 |
| Thickness of shell 21 | do | 0.060 |
| Cathode 21 material | | [1] 304 |
| Size of openings 37 | inches diameter | 1.75 |
| Size of openings 103 | do | 0.625 |
| Inner diameter of rings 124, 125, 127 | inches | 1.500 |
| Size of screens 123 and 126 | mesh | [2] 15 |
| Spacing between screens 123 and 126 | inch | 0.140 |
| Overall height of assembly 121 radially beyond cathode 21 | inch | 0.320 |
| Inner diameter of electrode 135 | do | 0.437 |
| Length of electrode 135 | do | 0.500 |
| Distance electrode 135 projects radially outwardly from cathode 21 | inch | 0.312 |
| Size of opening 80 | do | 1.125 |
| Outer diameter of sleeve 79 | do | 1.500 |
| Inner diameter of aperture 82 | do | 0.500 |
| Internal axial length of gun 22, 22a | do | 2.875 |
| Length of anode 84 | do | 1.000 |
| Minimum inner diameter of anode 84 | do | 0.625 |
| Maximum inner diameter of anode 84 | do | 0.825 |
| Spacing of filament 97 from the adjacent end of anode 84 | inch | 0.125 |
| Space between anode 84 and sleeve 79 | do | 0.187 |
| Thickness of aperture ring 81 | do | 0.375 |
| Distance between ring 81 and anode 84 | do | 0.500 |

[1] Stainless steel.
[2] Woven tungsten.

For a neutron count of $10^9$, the following operating parameters for the fusor of FIG. 23 may be used as an approximation. Adjustments of voltages and dimensions may be required for obtaining this precise count.

| | |
|---|---|
| Fusion-reactive gas | Deuterium and tritium, equal portions. |
| Neutral gas pressure in fusor | 2 microns. |
| Anode 20 circuit current | 30 milliamperes. |
| Anode 20 applied voltage | 100 kilovolts. |
| Voltage of supply 100 as applied to the anode 84 | 250 volts. |
| Voltage applied to the filament 97 | 6 volts. |
| Filament 97 current | 7 amperes. |
| Bias voltage on screens 126 | 500 volts. |

A viewing port assembly 168 is attached to the anode 20 as shown in FIG. 27 for the purpose of permitting observation, either directly or indirectly by means of closed circuit television equipment, of the reaction which occurs in the center, the outer end of the assembly 168 being vacuum sealed by reason of a window 169.

While there have been described above the principles of this invention in connection with specific apparatus, it is to be clearly understood that this description is made only by way of example and not as a limitation to the scope of the invention.

What is claimed is:

1. In a device for producing nuclear reactions, anode means, cathode means inside said anode means, said cathode means defining a volume centrally located with respect to both said anode and cathode means, said volume being free of tangible structure, said cathode means being open to the flow of gaseous particles therethrough, a fusion-reactive gas within said volume, means supplying a potential between said cathode and anode means for establishing an electric field therebetween, means including said cathode and anode means and said potential-supplying means for accelerating ions of said gas to fusion-reacting energies along converging radial paths in said volume, and means for inhibiting flow of electrons from said volume to said anode means, said inhibiting means including means for biasing the open portions of cathode means more negatively than the cathode means itself.

2. The device of claim 1 wherein said volume is substantially spherical in shape and said paths have a common intersection in the central portion of said volume, and further including means maintaining said gas at sub-atmospheric pressure.

3. The device of claim 1, said cathode means being a generally spherically shaped metallic shell having a plurality of openings therein.

4. The device of claim 3 wherein said anode means is a generally spherically shaped metallic shell concentrically surrounding said cathode shell, said inhibiting means including a plurality of biasing electrodes, one electrode for each opening, said biasing electrodes having portions peripherally coextensive with said openings, respectively, and means for applying biasing potential to said biasing electrodes for establishing said equipotential surfaces.

5. The device of claim 4, including means connected to said anode shell for generating and injecting charge-particles into the space between said cathode and anode means, the magnitude of said electric field being adequate to direct at least a portion of said charge-particles through at least a portion of said openings and into said volume.

6. The device of claim 4, including a plurality of ion guns carried by said anode shell in radial alignment with respective ones of said openings, means including said ion guns for directing ions through said openings and into said volume, whereby ions from said guns may be projected toward the opposite side of said anode shell.

7. The device of claim 6 wherein the first openings diametrically aligned with said ion guns, respectively, are free of structure and the remaining second openings are covered with biasing screens, respectively, means insulating said screens from the cathode shell next adjacent to said volume, the biasing electrodes for said first openings including annular elements coaxially fitted into the respective cathode shell openings, said annular elements being insulated from said cathode shell.

8. The device of claim 7 wherein each of said second openings is covered with two screens, the first of said screens being conductively mounted on said cathode shell, each second opening further having an annular insulating device coaxially surrounding the same and operatively mounted on the outer side of said cathode shell, each insulating device having a second of said screens mounted thereon spaced from the first screen, and connections to said second screens for biasing the same negatively with respect to said cathode shell.

9. The device of claim 6, wherein the means for maintaining said gas at sub-atmospheric pressure includes a supply of neutral fusion-reactive gas connected to said ion guns and also means for controlling the pressure of said gas as admitted to said ion guns in the range of from $10^{-3}$ to $10^{-8}$ millimeters of mercury, said ion guns and said anode shell being hermetically sealed and in communication with each other, said controlling means including a vacuum pump for exhausting gas from within the space of said anode shell.

10. The device of claim 2, said anode means incudling a generally spherical anode shell, said cathode means including two generally spherical concentric cathode shells spaced apart a predetermined distance, said two cathode shells having a plurality of openings therein which are in radial registry, said cathode shells being concentric with respect to said anode shell, means for biasing the outer one of said cathode shells more negative than the inner one.

11. The device of claim 10, including means connected to said anode shell for generating and injecting charge-particles into the space between said cathode and anode shells, the magnitude of said electric field being adequate to direct at least a portion of said charge-particles through at least a portion of said openings and into said volume.

12. The device of claim 11, including a plurality of ion guns carried by said anode shell in radial alignment with respective ones of said openings, means including said ion guns for directing ions through said openings and into said volume, whereby ions from said guns may be projected toward the opposite side of said anode shell.

13. The device of claim 12, wherein the first openings diametrically are free of structure and the remaining second openings of the outer cathode shell are covered with biasing screens, respectively, said screens being conductively secured to said outer cathode shell, said means for maintaining said gas at sub-atmospheric pressure includes a supply of neutral fusion-reactive gas connected to said ion guns and also means for controlling the pressure of said gas admitted to said guns in the range of from $10^{-3}$ to $10^{-8}$ millimeters of mercury, said ion guns and said anode shell being hermetically sealed and in communication with each other, said controlling means including a vacuum pump for exhausting gas from within the space of said anode shell.

14. The device of claim 13 including means connected to said anode means for coupling electrical power therefrom.

15. In a device for producing nuclear reactions comprising anode means, cathode means inside said anode means, said cathode means defining a volume free of tangible structure, a fusion-reactive gas within said volume, said cathode means having openings for the traversal therethrough of charge-particles, means including said anode and cathode means and ions of said gas forming a space charge in the central portion of said volume, said space charge including electrons and ions of said gas so distributed as to produce a substantially spherical electric field which confines target ions in a point-like region in said central portion and oscillates projectile ions through said region at nuclear reacting energies, whereby fusion reactions result from collisions between said projectile ions and between said projectile ions and target ions, and means for biasing the openings in said cathode means negatively with respect to said cathode means for inhibiting the flow of electrons from the volume inside said cathode means to said anode means.

16. The device of claim 15 wherein said space charge is arranged in a configuration which provides a spherical virtual anode concentrically surrounding a spherical virtual cathode, said cathode means including a generally spherical shell concentrically surrounding said virtual anode thereby providing an electric field therebetween which exerts a force outwardly on a positively charged particle in a direction radially toward said cathode means, the potential of said virtual anode being of a magnitude which propels ions inwardly and oscillates them as projectiles through said virtual cathode at nuclear-reacting energies, whereby collisions of ions in the region of said virtual cathode produces nuclear reactions.

17. The device of claim 15 wherein said gas is of a composition that reactant products of fusion include positively charged particles which are propelled outwardly against the field of said anode means with sufficient energy to transfer the charges thereof to said anode means thereby generating electrical power, and circuit means connected to said anode means for coupling the generated electrical power therefrom to a utilization device.

18. The device of claim 17 wherein said anode means includes a generally spherical conductive anode shell, said cathode means includes a generally spherical conductive cathode shell concentrically positioned inside said anode shell, said cathode shell having said openings therein, said positively charged particles passing through said openings in transit from said volume toward said anode shell, and said circuit means including a load impedance connected in series between said anode and cathode means whereby said generated electrical power may be coupled from said impedance to a utilization device.

19. The device of claim 17 wherein said space charge-forming means includes a power supply connected to said anode and cathode means for applying an operating voltage thereto; the value of said operating voltage, the composition of said gas and the number of gaseous particles within said volume being so related that the fusion reactions are self-sustaining and contribute more power to said circuit means than is consumed in initiating such reactions.

References Cited

UNITED STATES PATENTS 3,258,402   6/1966   Farnsworth _____ 176—1

REUBEN EPSTEIN, *Primary Examiner.*